(12) United States Patent
Koukan et al.

(10) Patent No.: US 11,279,223 B2
(45) Date of Patent: Mar. 22, 2022

(54) VALVE MODULE

(71) Applicant: KAUTEX TEXTRON GMBH & CO. KG, Bonn (DE)

(72) Inventors: Ibrahim Koukan, Cologne (DE); Stefan Wind, Hennef (DE); Gernot Weiss, Neunkirchen (DE); Axel Barkow, Huerth (DE); Dirk Eulitz, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 16/612,015

(22) PCT Filed: Feb. 27, 2018

(86) PCT No.: PCT/EP2018/054789
§ 371 (c)(1),
(2) Date: Nov. 8, 2019

(87) PCT Pub. No.: WO2018/206176
PCT Pub. Date: Nov. 15, 2018

(65) Prior Publication Data
US 2020/0198462 A1     Jun. 25, 2020

(30) Foreign Application Priority Data

May 8, 2017   (DE) ................... 10 2017 207 747.6

(51) Int. Cl.
   *B60K 15/035*   (2006.01)
   *F02M 25/08*    (2006.01)
   (Continued)

(52) U.S. Cl.
   CPC ...... *B60K 15/03519* (2013.01); *B60K 15/035* (2013.01); *F02M 25/089* (2013.01);
   (Continued)

(58) Field of Classification Search
   CPC ............ F02M 25/0872; F02M 25/089; F02M 2025/0845; B60K 15/035;
   (Continued)

(56) References Cited

U.S. PATENT DOCUMENTS

| | | | | |
|---|---|---|---|---|
| 4,926,825 A | * | 5/1990 | Ohtaka ............... | F02D 41/0032 123/520 |
| 5,327,934 A | * | 7/1994 | Thompson ......... | F02M 25/0872 123/519 |

(Continued)

FOREIGN PATENT DOCUMENTS

| | | |
|---|---|---|
| CN | 102971192 | 3/2013 |
| CN | 103732434 | 4/2014 |

(Continued)

OTHER PUBLICATIONS

Office Action from related Chinese Appln. No. 2018800456260, dated May 29, 2020. English translation attached.

(Continued)

*Primary Examiner* — John M Zaleskas
(74) *Attorney, Agent, or Firm* — Grossman, Tucker, Perreault & Pfleger, PLLC

(57) ABSTRACT

A valve module for an operating fluid container system. The valve module has a housing which has a first connection for fluidically connecting to an operating fluid container interior, a second connection for fluidically connecting to a filler tube, and a third connection for at least indirectly fluidically connecting to the atmosphere. The valve module comprises the following features: the first connection is connected to the second connection and the third connection within the housing in a fluidic manner in each case; the second connection is connected to the third connection within the housing in a fluidic manner; and the first connection, the second connection, and the third connection can each be adjusted independently of one another between an open (Continued)

position, in which fluid communication through the respective connection is allowed, and a closed position, in which fluid communication through the respective connection is prevented.

23 Claims, 13 Drawing Sheets

(51) Int. Cl.
*F16K 11/10* (2006.01)
*F16K 11/22* (2006.01)
*F16K 11/24* (2006.01)
*B60K 15/03* (2006.01)

(52) U.S. Cl.
CPC ............ *F16K 11/105* (2013.01); *F16K 11/22* (2013.01); *F16K 11/24* (2013.01); *B60K 2015/0348* (2013.01); *B60K 2015/03217* (2013.01); *B60K 2015/03302* (2013.01); *B60K 2015/03509* (2013.01); *B60K 2015/03514* (2013.01); *B60K 2015/03538* (2013.01); *B60K 2015/03552* (2013.01); *B60K 2015/03561* (2013.01); *B60K 2015/03566* (2013.01); *B60K 2015/03576* (2013.01); *B60Y 2200/92* (2013.01); *F02M 25/0836* (2013.01)

(58) Field of Classification Search
CPC ........ B60K 15/03504; B60K 15/03519; B60K 2015/03302; B60K 2015/03514; B60K 2015/03538; B60K 2015/03552
See application file for complete search history.

(56) References Cited

U.S. PATENT DOCUMENTS

| | | | | |
|---|---|---|---|---|
| 5,388,611 | A | * | 2/1995 | Harris ................ F02M 25/0836 123/519 |
| 5,529,026 | A | | 6/1996 | Kurr et al. |
| 5,579,742 | A | * | 12/1996 | Yamazaki ........ B60K 15/03504 123/516 |
| 5,603,349 | A | * | 2/1997 | Harris .................. B60K 15/035 123/519 |
| 5,819,796 | A | * | 10/1998 | Kunimitsu ....... B60K 15/03519 137/587 |
| 5,878,728 | A | * | 3/1999 | Kidokoro ................ F02M 25/08 123/519 |
| 6,000,426 | A | * | 12/1999 | Tuckey ................ B60K 15/035 123/516 |
| 6,006,799 | A | * | 12/1999 | Kraft ............... B60K 15/03519 141/302 |
| 6,732,759 | B2 | * | 5/2004 | Romanek ......... B60K 15/03504 137/587 |
| 6,948,523 | B2 | * | 9/2005 | Viebahn ............... B60K 15/035 123/516 |
| 9,061,584 | B2 | | 6/2015 | Koukan |
| 9,222,446 | B2 | | 12/2015 | Reddy |
| 9,227,609 | B2 | | 1/2016 | Gilles et al. |
| 2003/0025095 | A1 | | 2/2003 | Sticht |
| 2004/0089063 | A1 | * | 5/2004 | Matsubara ......... F02M 25/0818 73/114.41 |
| 2004/0103952 | A1 | * | 6/2004 | Benjey ............. B60K 15/03519 141/59 |
| 2007/0272219 | A1 | | 11/2007 | Hill |
| 2008/0047532 | A1 | * | 2/2008 | Hill ..................... F16K 11/0716 123/518 |
| 2008/0105329 | A1 | | 5/2008 | Benjey |
| 2008/0163939 | A1 | | 7/2008 | Williams et al. |
| 2010/0319796 | A1 | | 12/2010 | Whitaker |
| 2012/0152210 | A1 | * | 6/2012 | Reddy ................... F02M 25/089 123/520 |
| 2013/0037007 | A1 | * | 2/2013 | Reddy .............. B60K 15/03504 123/521 |
| 2014/0197188 | A1 | * | 7/2014 | Criel ................ B60K 15/03504 220/746 |
| 2016/0144711 | A1 | * | 5/2016 | Criel ................ B60K 15/03519 137/14 |
| 2016/0152132 | A1 | * | 6/2016 | Dedeurwaerder ...... F16K 17/00 137/14 |
| 2016/0298576 | A1 | * | 10/2016 | Reddy ............. B60K 15/03504 |
| 2016/0341141 | A1 | * | 11/2016 | Dudar ................ G01M 3/3272 |
| 2016/0368371 | A1 | * | 12/2016 | Hill .................. B60K 15/03504 |
| 2017/0328311 | A1 | * | 11/2017 | Franklin ................ F02M 25/08 |
| 2018/0050587 | A1 | * | 2/2018 | Qin ........................ B60K 15/05 |
| 2018/0087475 | A1 | * | 3/2018 | Mills ................ B60K 15/03519 |
| 2018/0195445 | A1 | * | 7/2018 | Iriyama .............. F02M 25/0836 |
| 2018/0229600 | A1 | * | 8/2018 | Higgin ................... B60K 15/04 |
| 2019/0040821 | A1 | * | 2/2019 | Ishihara ............. F02M 25/0836 |
| 2019/0145326 | A1 | * | 5/2019 | Nahar ................ F02M 25/0872 123/519 |
| 2019/0353121 | A1 | * | 11/2019 | Mills ................ B60K 15/03519 |

FOREIGN PATENT DOCUMENTS

| | | | | |
|---|---|---|---|---|
| DE | 19720670 | | 11/1998 | |
| DE | 19901080 | | 7/2000 | |
| DE | 10247935 | A1 * | 4/2004 | ....... B60K 15/03519 |
| DE | 102012213955 | | 2/2013 | |
| EP | 0639736 | | 2/1995 | |
| EP | 3040227 | A1 * | 7/2016 | ....... B60K 15/03519 |
| FR | 2800125 | | 4/2001 | |
| WO | 2006/072633 | | 7/2006 | |
| WO | 2009/067815 | | 6/2009 | |
| WO | 2014/206895 | | 12/2014 | |
| WO | 2016/049320 | | 3/2016 | |
| WO | WO-2017046242 | A1 * | 3/2017 | ....... B60K 15/03519 |

OTHER PUBLICATIONS

English translation of the International Search Report, received in corresponding PCT Application No. PCT/EP2018/054789, dated Jun. 20, 2018.
English translation of the Written Opinion, received in corresponding PCT Application No. PCT/EP2018/054789, dated Jun. 20, 2018.

\* cited by examiner

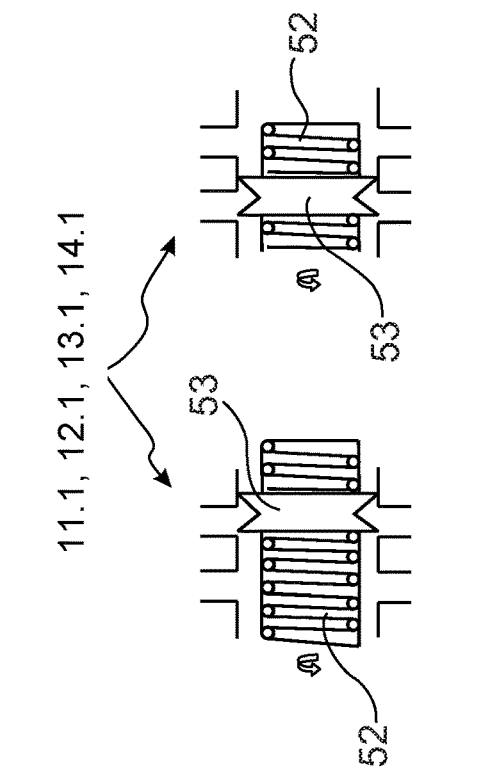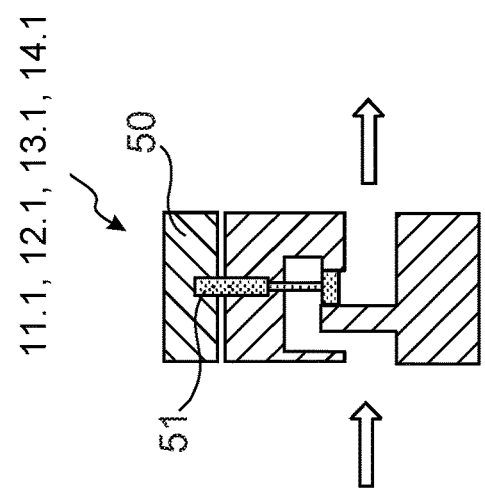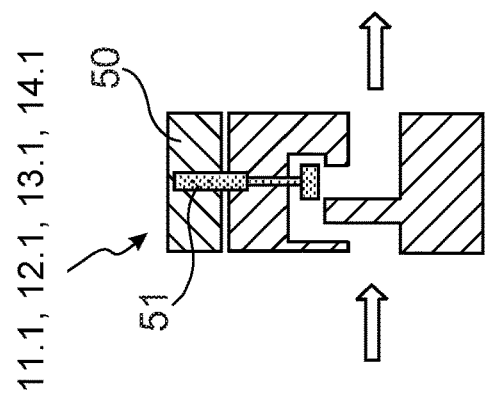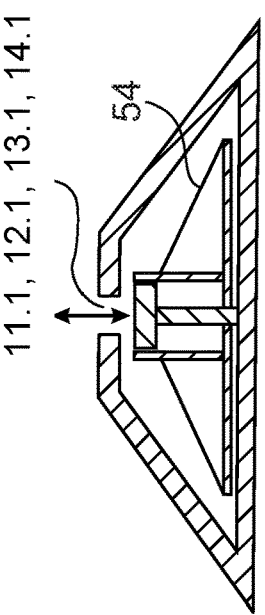

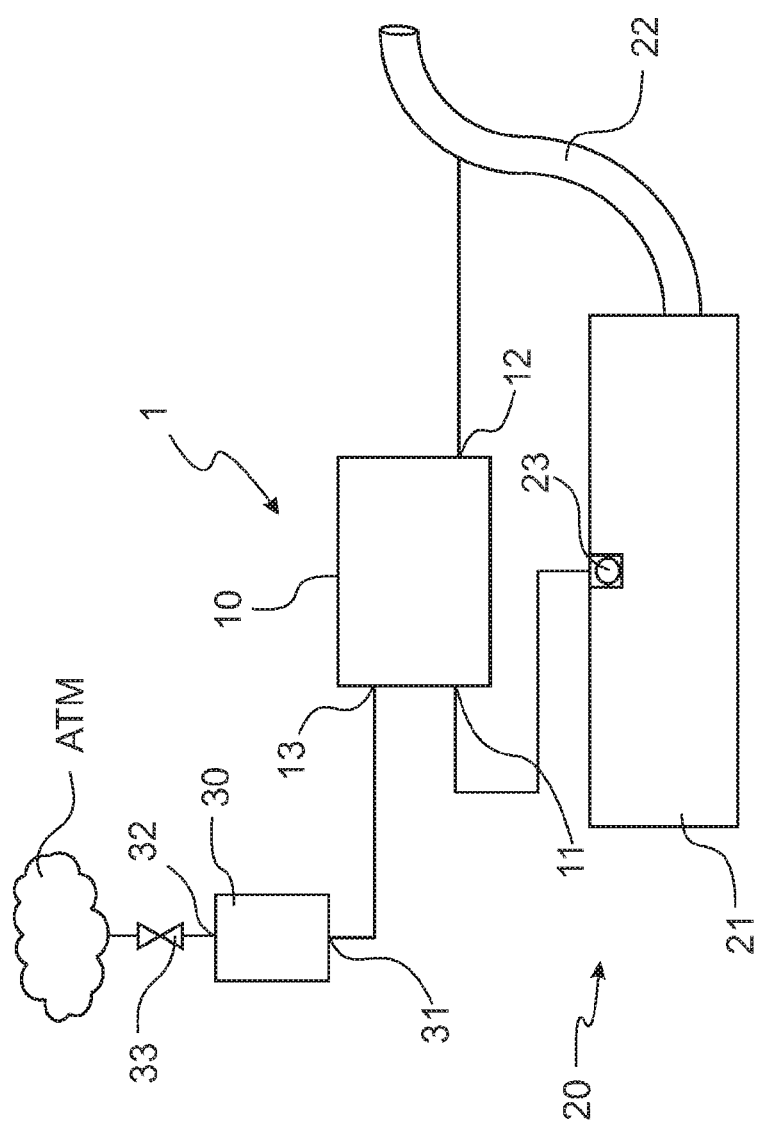

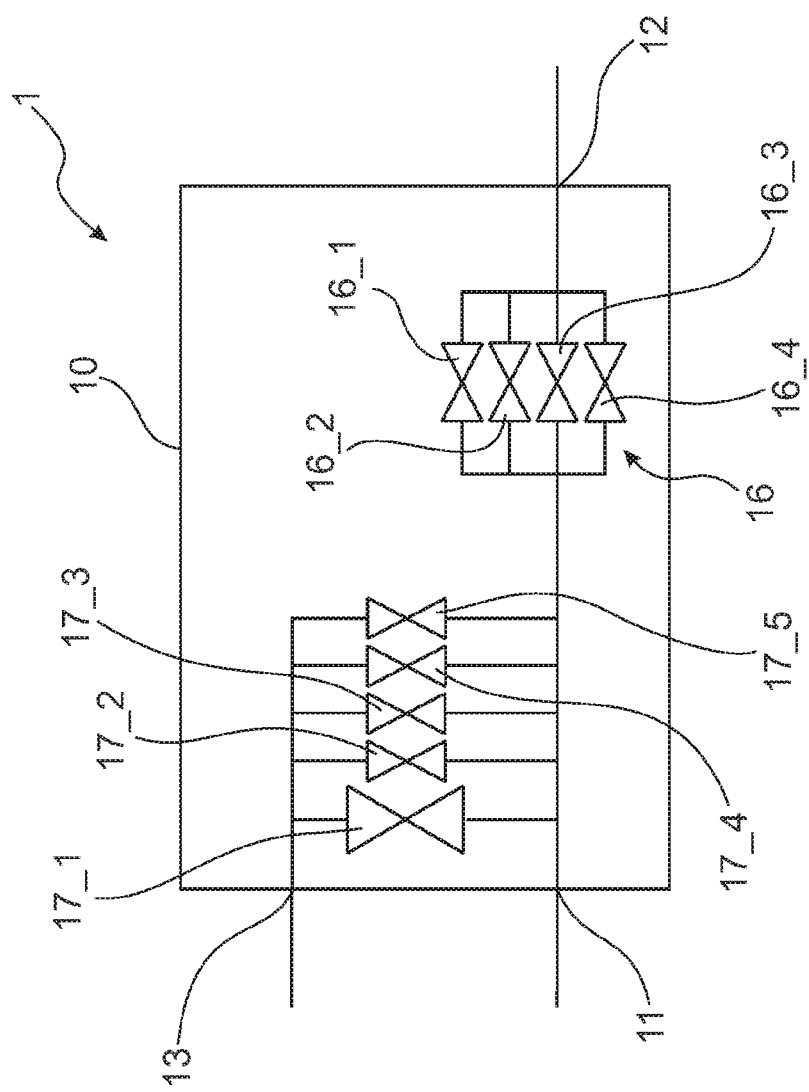

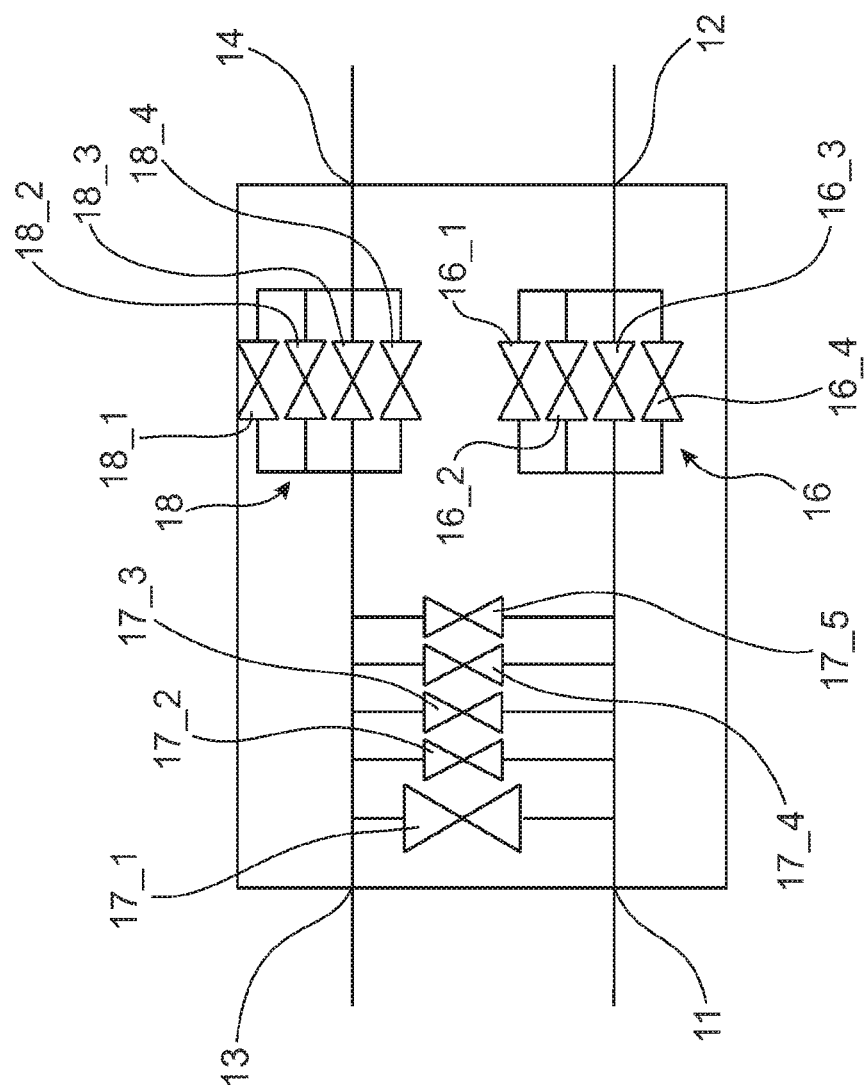

VALVE MODULE

FIELD

The present invention relates to a valve module for an operating liquid container system. The present invention also relates to an operating liquid container system.

BACKGROUND

Reference will be made below to operating liquid containers designed as fuel containers or as fuel tanks and to operating liquid container systems designed as fuel container systems. Operating liquid containers within the meaning of the invention are in particular, but not exclusively, fuel containers (for gasoline fuels or diesel fuels), urea containers, windscreen washer containers, oil containers, auxiliary liquid containers or additive containers, in each case for motor vehicles.

It is known from the prior art that, for the ventilation of a fuel container, said fuel container has at least one ventilation valve, which in turn is fluidically connected to a ventilation line for the purposes of dissipating the positive pressure to the atmosphere. In particular for fuel containers designed for gasoline fuel, the ventilation lines thereof are commonly fluidically connected to activated carbon filters for conducting and filtering out fuel vapors. The gases filtered by the activated carbon filter are, after passing through the activated carbon filter, released to the atmosphere. During the refueling of a fuel container, the ventilation valve is situated in its open position in order that gas (fuel vapor-air mixture) that is expelled from the fuel container during the refueling process can be dissipated to the atmosphere—possibly having been filtered by an activated carbon filter. A stoppage of refilling or stoppage of refueling is initiated in that the ventilation valve is closed by the fuel rising in the fuel container, whereby a dissipation of the gases/vapors situated in the fuel container via the ventilation valve is prevented. Further introduction of fuel via a filler pipe that opens into the fuel container interior causes the pressure within the fuel container to rise, such that a fuel level within the filler pipe also rises, until the fuel level closes a refueling nozzle inserted into the filler pipe, whereupon an outflow of fuel is ended at the refueling nozzle.

The fuel containers known from the prior art are furthermore commonly fluidically connected, via a further valve, to a filler pipe that opens into the fuel container. This is because the fuel that is introduced into the fuel container always also draws air into the fuel container. By means of a fluidic connection of the fuel container, more specifically of the fuel container interior, to the filler pipe, gas (fuel vapor-air mixture) that is expelled from the fuel container is drawn back into the fuel container. This fuel-vapor mixture is saturated, such that less fuel changes into the vapor phase. A loading of an activated carbon filter with fuel vapors is thus reduced.

To purge an activated carbon filter, the latter is commonly fluidically connected by means of a purge valve to an intake tract of an internal combustion engine.

In different countries, there are different regulations with regard to the handling of the vapors that are expelled from the fuel container during the refueling process. Accordingly, in certain countries, all of the vapor that is expelled from the fuel container must be conducted through an activated carbon filter. In other countries in turn, the gases that are expelled from the fuel container may be released via the filler pipe to the environment, where they are commonly extracted by an extraction device, wherein the extraction device may be part of a filling installation, for example a filling station.

SUMMARY

The present invention is based on the object of providing a valve module for an operating liquid container system which is suitable for different operating liquid systems. Furthermore, the present invention is based on the object of providing an improved operating liquid container system.

More specifically, the object on which the present invention is based is achieved by means of a valve module for an operating liquid container system, which valve module has a housing with a first port for fluidic connection to an operating liquid container interior, a second port for fluidic connection to a filler pipe and a third port for at least indirect fluidic connection to the atmosphere. The valve module according to the invention is characterized in that the first port is fluidically connected, within the housing, in each case to the second port and to the third port. Furthermore, the second port is fluidically connected, within the housing, to the third port. The valve module according to the invention is furthermore characterized in that the first port and the second port and the third port are each independently of one another adjustable in each case between an open position, in which fluid communication through the respective port is made possible, and a closed position, in which fluid communication through the respective port is prevented.

The valve module according to the invention has the advantage that all components that are required for ventilation during refueling and ventilation during operation and for possible purging of an adsorption filter are combined in one assembly. In this way, an operating liquid container system equipped with the valve module according to the invention has a relatively simple construction and can be used for operating liquid container systems of different form and design. For example, it is possible for ports on the operating liquid container itself and on an adsorption filter to be reduced. An operating liquid container of an operating liquid container system that uses the valve module according to the invention requires only a single port, which is realized for example by means of a roll-over valve, which is connected by means of a fluid line to the first port of the valve module in order to permit various refueling ventilation configurations (ventilation of the gases expelled from the operating liquid container either via an adsorption filter and/or via the filler pipe) and operational ventilation.

The first port is consequently designed to be fluidically connected to an operating liquid container interior. The first port may also be referred to as inlet port and/or as main port and/or as tank port of the valve module.

The second port is consequently designed to be fluidically connected to a filler pipe. The filler pipe preferably opens into the operating liquid container interior and serves for filling of the operating liquid container with an operating liquid. The second port may also be referred to as ventilation port and/or as recirculation port.

The third port is consequently designed to be fluidically connected at least indirectly to the atmosphere. The third port is preferably fluidically connected by means of an activated carbon filter to the atmosphere. The third port may also be referred to as filter port.

Consequently, the first, second and third ports are fluidically connected to one another. In other words, each of the first, second and third ports is fluidically connected to each other one of the first, second and third ports.

Operating liquid containers within the meaning of the invention are in particular, but not exclusively, fuel containers (for gasoline fuels or diesel fuels), urea containers, windscreen washer containers, oil containers, auxiliary liquid containers or additive containers, in each case for motor vehicles. The operating liquid container is preferably designed as a fuel container. The operating liquid container system is preferably designed as a fuel container system.

The valve module is preferably designed such that a first valve apparatus is arranged between the first port and the second port and is fluidically connected to the first port and to the second port, wherein the first valve apparatus is actuatable between an open position, in which a fluid flow between the first port and the second port is made possible by the first valve apparatus, and a closed position, in which a fluid flow between the first port and the second port is prevented by the first valve apparatus. Furthermore, a second valve apparatus is arranged between the first port and the third port and is fluidically connected to the first port and to the third port, wherein the second valve apparatus is actuatable between an open position, in which a fluid flow between the first port and the third port is made possible by the second valve apparatus, and a closed position, in which a fluid flow between the first port and the third port is prevented by the second valve apparatus.

By means of corresponding opening and closing of the first valve apparatus and/or of the second valve apparatus, the first port can be connected as desired to the second port and/or to the third port. The same applies to a fluidic connection between the second port and the third port.

The valve module is preferably designed such that the first valve apparatus has at least two first valve devices which are fluidically connected to one another in parallel, wherein each first valve device is actuatable between an open position and a closed position.

By means of a corresponding design of the valve module, it is made possible in a simple manner for a flow resistance between the first port and the second port to be adjustable through corresponding actuation or adjustment of individual first valve devices between the open position thereof and the closed position thereof. The valve module can thus be easily adapted to the corresponding operating states of an operating liquid container system.

The valve module is preferably designed such that the at least two first valve devices have mutually different free opening cross-sectional areas.

The free opening cross-sectional area is to be understood according to the invention to mean in particular the free opening cross-sectional area of a valve seat of the first valve device.

The valve module is preferably designed such that the second valve apparatus has at least two second valve devices which are fluidic ally connected to one another in parallel, wherein each second valve device is actuatable between an open position and a closed position.

By means of a corresponding design of the valve module, it is made possible in a simple manner for a flow resistance between the first port and the third port to be adjustable through corresponding actuation or adjustment of individual second valve devices between the open position thereof and the closed position thereof. The valve module can thus be easily adapted to the corresponding operating states of an operating liquid container system.

The valve module is preferably designed such that the at least two second valve devices have mutually different free opening cross-sectional areas.

The free opening cross-sectional area is to be understood according to the invention to mean in particular the free opening cross-sectional area of a valve seat of the second valve device.

The respective first valve devices and/or second valve devices may be designed in particular as linear solenoid valves with a plunger and/or as rotary solenoid valves. Furthermore, the respective first valve devices and/or second valve devices may be designed as actuating motor or stepper motor valves, which further preferably have a camshaft or a rotary cylinder or a spindle drive. Furthermore, the respective first valve devices and/or second valve devices may be based on the shape memory principle. Furthermore, the respective first valve devices and/or second valve devices may be actuatable between the open position thereof and the closed position thereof by means of a piezo crystal and/or by means of travelling waves. There are therefore no limitations with regard to the designs of the respective first valve devices and/or second valve devices.

The valve module is preferably designed such that the first valve apparatus and/or the second valve apparatus are/is electrically actuatable between the open position and the closed position.

The correspondingly constructed valve module is particularly easily controllable, for example by means of an electronic control device, which may be part of a motor vehicle or part of the operating liquid container system.

An electrical actuation of the first valve apparatus and/or of the second valve apparatus is to be understood within the meaning of the present invention as an electromechanical and/or electromagnetic actuation of the respective valve apparatuses.

If the first valve apparatus has at least two first valve devices that are connected to one another fluidically in parallel, then an electrical actuation of the first valve apparatus is to be understood within the meaning of the present invention to mean an electromechanical and/or electromagnetic actuation of the respective first valve devices.

If the second valve apparatus has at least two second valve devices which are connected to one another fluidically in parallel, then an electrical actuation of the second valve apparatus is to be understood within the meaning of the present invention to mean an electromechanical and/or electromagnetic actuation of the respective second valve devices.

The valve module is preferably designed such that the housing has a fourth port for fluidic connection to an intake tract of an internal combustion engine, wherein the first port and the second port and the third port are each fluidically connected, within the housing, to the fourth port. Here, the fourth port is adjustable between an open position, in which fluid communication through the fourth port is made possible, and a closed position, in which fluid communication through the fourth port is prevented.

The fourth port is consequently designed to be fluidically connected to an intake tract of an internal combustion engine. The fourth port may also be referred to as purging port or regeneration port.

The valve module is preferably designed such that a third valve apparatus is arranged between the third port and the fourth port and is fluidically connected to the third port and to the fourth port, wherein the third valve apparatus is actuatable between an open position, in which a fluid flow between the third port and the fourth port is made possible by the third valve apparatus, and a closed position, in which a fluid flow between the third port and the fourth port is prevented by the third valve apparatus.

By means of corresponding opening and closing of the third valve apparatus, the fourth port can be connected as desired to the first port and/or to the second port and/or to the third port, if the first valve apparatus and/or the second valve apparatus is correspondingly actuated.

The valve module is preferably designed such that the third valve apparatus has at least two third valve devices which are fluidically connected to one another in parallel, wherein each third valve device is actuatable between an open position and a closed position.

By means of a corresponding design of the valve module, it is made possible in a simple manner for a flow resistance between the third port and the force port to be adjustable through corresponding actuation or adjustment of individual third valve devices between the open position thereof and the closed position thereof. The valve module can thus be easily adapted to the corresponding operating states of an operating liquid container system.

The valve module is preferably designed such that the at least two third valve devices have mutually different free opening cross-sectional areas.

The free opening cross-sectional area is to be understood according to the invention to mean in particular the free opening cross-sectional area of a valve seat of the third valve device.

The valve module is preferably designed such that the first port and/or the second port and/or the third port and/or the fourth port are/is each actuatable electrically between the open position and the closed position.

The correspondingly constructed valve module is particularly easily controllable, for example by means of an electronic control device, which may be part of a motor vehicle or part of the operating liquid container system.

An electrical actuation of the respective ports is to be understood within the meaning of the present invention to mean an electromechanical and/or electromagnetic actuation of the respective ports.

The valve module is preferably designed such that the first port is designed as a first valve and/or the second port is designed as a second valve and/or the third port is designed as a third valve and/or the fourth port is designed as a fourth valve.

A correspondingly designed valve module exhibits high flexibility or adaptability to different intended uses.

The respective valves may in particular be designed as linear solenoid valves with a plunger and/or as rotary solenoid valves. Furthermore, the respective valves may be designed as actuating motor or stepper motor valves, which further preferably have a camshaft or a rotary cylinder or a spindle drive. Furthermore, the respective valves may be based on the shape memory principle. Furthermore, the respective valves may be actuatable between the open position thereof and the closed position thereof by means of a piezo crystal and/or by means of travelling waves. There are therefore no limitations with regard to the designs of the respective valves.

The valve module is preferably designed such that the first valve and/or the second valve and/or the third valve and/or the fourth valve are each designed as a proportional valve and are/is electrically adjustable in continuous fashion between an open position and a closed position.

The respective valves of the valve module are, in a corresponding embodiment, adjustable between the open position, in which the flow resistance of the respective valves—that is to say of the first valve and/or of the second valve and/or of the third valve and/or of the fourth valve—is at a minimum, and a closed position, in which the flow resistance of the respective valves is at a maximum. In the open position, a spacing between a valve body and a valve seat is preferably at a maximum, whereas the valve body closes the valve seat in the closed position. In this way, an effective ventilation cross-sectional area of the respective valve is varied. The effective ventilation cross-sectional area of the respective valve is the free opening (area of the opening) of the respective valve through which the gas expelled from the operating liquid container (for example during a filling process) must flow out. The effective ventilation cross-sectional area may also be referred to as effective ventilation opening of the respective valves.

If the effective ventilation cross-sectional area of one of the valves of the valve module is reduced, the corresponding valve of the valve module is transferred into an intermediate position between the open position and the closed position.

In the respective open positions thereof, the respective valves have a maximum ventilation cross-sectional area which is dependent on their type of construction. In the closed position of the respective valves, the ventilation cross-sectional area is preferably zero.

The reduction of the effective ventilation cross-sectional area of a valve of the valve module is preferably realized by means of partial and/or continuously variable closure of a valve seat of the corresponding valve by means of a valve body of the corresponding valve. In the open position of the corresponding valve, the valve body has a valve-specific maximum spacing to the valve seat, which can also be referred to as valve opening. In the closed position of the corresponding valve, the valve body closes the valve seat, such that the ventilation cross-sectional area is zero.

It is also possible for each of the valves of the valve module to have a ventilation opening which is variable/changeable by means of a slide which is actuatable/displaceable perpendicularly with respect to a line normal to the area of the ventilation opening. Furthermore, each valve of the valve module may have a throttle flap. According to the invention, there are thus no limitations with regard to the design of the valves of the valve module.

The valve module is preferably designed such that the first port and/or the second port and/or the third port and/or the fourth port are/is adjustable in discrete fashion between the respective open position thereof and the respective closed position thereof.

Discrete adjustability of one of the ports of the valve module means that the corresponding port can be moved/changeable/actuated in targeted fashion only into its open position or into its closed position. A reduction of the volume flow that can be caused to flow through a corresponding port is, in the case of a correspondingly designed valve module, realized by means of intermittent adjustment of the respective port between the open position thereof and the closed position thereof. A corresponding intermittent actuation of the corresponding port may also be referred to as clocking and/or pulsing of the port.

The valve module is preferably designed such that the valve module has a liquid-vapor separator, by which the first port and the second port are fluidically connected to the third port and to the fourth port.

A correspondingly designed valve module exhibits yet further increased integration density, such that an operating liquid container system equipped with said valve module has fewer individual parts or individual components. By means of the liquid-vapor separator, it is ensured that no operating liquid passes in liquid form into the atmosphere or onto an adsorption filter that is installed between the fourth port and the atmosphere.

The valve module is preferably designed so as to have an overpressure protection valve which is arranged between the first port and the fourth port and is fluidically connected to each of these. The overpressure protection valve is movable between an open position, in which an exchange of gas is made possible by the overpressure protection valve, and a closed position, in which an exchange of gas is prevented by the overpressure protection valve. The overpressure protection valve is situated in its closed position if the internal pressure in the operating liquid container interior is lower than the maximum pressure, and the overpressure protection valve is transferred into the open position thereof if the internal pressure in the operating liquid container interior is higher than the maximum pressure.

The overpressure protection valve is consequently connected in parallel between the first port and the fourth port. The overpressure protection valve may preferably be arranged and realized within the valve module.

The overpressure protection valve is preferably a passive overpressure protection valve. This means that a valve body of the overpressure protection valve is movable not electrically (that is to say neither electromechanically nor electromagnetically) but merely by means of a pressure difference.

The valve module is preferably designed so as to have an underpressure protection valve. The underpressure protection valve is preferably arranged between the first port and the fourth port and fluidically connected to each of these. Alternatively, the underpressure protection valve is preferably arranged between the first port and the second port and fluidically connected to each of these. The underpressure protection valve is movable between an open position, in which an exchange of gas is made possible by the underpressure protection valve, and a closed position, in which an exchange of gas is prevented by the underpressure protection valve. The underpressure protection valve is situated in its closed position if the internal pressure in the operating liquid container interior is higher than the minimum pressure, and the underpressure protection valve is transferred into the open position thereof if the internal pressure in the operating liquid container interior is lower than the minimum pressure.

The underpressure protection valve may preferably be arranged and realized within the valve module.

The underpressure protection valve is preferably a passive underpressure protection valve. This means that a valve body of the underpressure protection valve is movable not electrically (that is to say neither electromechanically nor electromagnetically) but merely by means of a pressure difference.

The valve module is preferably designed so as to have the following features:
the ratio of a first cross-sectional area of the first port to a second cross-sectional area of the second port amounts to between 0.64 and 41; and/or
the ratio of a first cross-sectional area of the first port to a fourth cross-sectional area of the fourth port amounts to between 1 and 7.3; and/or
the ratio of a first cross-sectional area of the first port to a third cross-sectional area of the third port amounts to between 0.5 and 4.

In the case of a corresponding design of the valve module, cross-sectional areas or the diameters of the first to fourth ports may be dimensioned such that, with the smallest possible first to fourth across-sectional areas, fluid flows through the first to fourth ports that are great enough to ensure the functionality of the valve module are still made possible.

Accordingly, in the case of in each case circular first to fourth ports of the valve module, the following is realized:
the ratio of a first diameter of the first port to a second diameter of the second port amounts to between 0.8 and 6.4; and/or
the ratio of a first diameter of the first port to a fourth diameter of the fourth port amounts to between 1 and 2.7; and/or
the ratio of a first diameter of the first port to a third diameter of the third port amounts to between 0.7 and 2.

Preferably, the diameter of the first port amounts to between 12 mm and 16 mm, the diameter of the second port amounts to between 2.5 mm and 6 mm, the diameter of the fourth port amounts to between 6 mm and 10 mm, and the diameter of the third port amounts to between 12 mm and 16 mm.

More preferably, the diameter of the first port amounts to between 10 mm and 12 mm, the diameter of the second port amounts to between 10 mm and 12 mm, the diameter of the fourth port amounts to between 6 mm and 10 mm, and the diameter of the third port amounts to between 6 mm and 8 mm.

The object on which the present invention is based is furthermore achieved by means of an operating liquid container system for a motor vehicle having an internal combustion engine, which operating liquid container system has an operating liquid container, into the operating liquid container interior of which a filler pipe for filling the operating liquid container interior with an operating liquid opens. The operating liquid container system according to the invention has an above-described valve module, wherein the first port of the valve module is fluidically connected to the operating liquid container interior, the second port of the valve module is fluidically connected to the filler pipe, and the third port of the valve module is fluidically connected at least indirectly to the atmosphere.

The operating liquid container system according to the invention has the advantage that all components that are required for ventilation during refueling and ventilation during operation and for possible purging of an adsorption filter are combined in one assembly. In this way, the operating liquid container system according to the invention has fewer individual components than operating liquid container systems known from the prior art. The operating liquid container system according to the invention has a simplified construction. For example, it is possible for ports on the operating liquid container itself and on an adsorption filter to be reduced. An operating liquid container of the operating liquid container system according to the invention requires only a single port, which is realized for example by means of a roll-over valve, which is connected by means of a fluid line to the first port of the valve module in order to permit various refueling ventilation configurations (ventilation of the gases expelled from the operating liquid container either via an adsorption filter and/or via the filler pipe) and operational ventilation.

Operating liquid containers within the meaning of the invention are in particular, but not exclusively, fuel containers (for gasoline fuels or diesel fuels), but also urea containers, windscreen washer containers, oil containers, auxiliary liquid containers or additive containers, in each case for motor vehicles. The operating liquid container is preferably designed as a fuel container. The operating liquid container system is preferably designed as a fuel container system.

The operating liquid container system is preferably designed so as to have a valve module, wherein the fourth port is fluidically connected to an intake tract of the internal combustion engine.

The operating liquid container system preferably has an adsorption filter for the adsorption of operating liquid that is present in the vapor phase, wherein the third port of the valve module is fluidically connected to the adsorption filter.

The correspondingly designed operating liquid container system has a simplified construction in relation to operating liquid container systems known from the prior art, because the adsorption filter is fluidically connected only via a single port of the adsorption filter to the operating liquid container interior and to an intake tract of the internal combustion engine. Depending on the switching of the respective ports of the valve module, the adsorption filter can be fluidically connected to the intake tract of the internal combustion engine in order to be purged by means of intake air. Furthermore, with corresponding switching of the ports of the valve module, the adsorption filter can be fluidically connected to the operating liquid container interior for operational ventilation and/or ventilation during refueling. Furthermore, loading of the adsorption filter can be prevented through corresponding switching of the first and/or of the fourth port into the respective closed position thereof, such that there is no fluid communication of the operating liquid container interior with the adsorption filter.

The adsorption filter is preferably designed as an activated carbon filter.

The operating liquid container system preferably has an above-described valve module, in the case of which the first valve apparatus and/or the second valve apparatus are/is actuatable electrically between the open position and the closed position. Furthermore, the operating liquid container system has an electronic control device which is coupled to the valve module via a data line and/or via an electrical line for the exchange of data and/or electrical energy, wherein the first valve apparatus and the second valve apparatus are actuatable between the respective open positions thereof and the respective closed positions thereof by means of control signals output by the control device.

Preferably, the first valve apparatus and/or the second valve apparatus are each actuatable/adjustable into an intermediate position by means of control signals output by the control device, wherein the intermediate position is between the respective open position and the respective closed positions of the respective valve apparatus.

Preferably, the operating liquid container system has an above-described valve module, in the case of which the first port and/or the second port and/or the third port and/or the fourth port are/is each electrically actuatable between the open position and the closed position. Furthermore, the operating liquid container system has an electronic control device which is coupled to the valve module via a data line and/or via an electrical line for the exchange of data and/or electrical energy, wherein the first port, the second port, the third port and the fourth port are each actuatable between the respective open positions thereof and the respective closed positions thereof by means of control signals output by the control device.

Preferably, the first port and/or the second port and/or the third port and/or the fourth port are each actuatable/adjustable into an intermediate position by means of control signals output by the control device, wherein the intermediate position is between the respective open position and the respective closed positions of the respective port.

More preferably, the operating liquid container system has at least one fill level sensor for determining a fill level of the operating liquid in the operating liquid container, wherein the electronic control device is coupled to the fill level sensor via a data line for the receipt of data.

In the case of the correspondingly designed operating liquid container system, a stoppage of refueling can be initiated when a setpoint fill level is reached. In particular, by control of the first port and/or of the second port into an intermediate position between the open position thereof and the closed position thereof, a slow rise of an operating liquid column in the filler pipe can be achieved, such that, upon a stoppage of refueling initiated in this way, less operating liquid, or even no operating liquid at all, escapes from the filler pipe owing to upwardly surging operating liquid.

The operating liquid container system preferably has an overpressure protection valve which is arranged in a fluid line between the operating liquid container interior and the atmosphere, wherein the overpressure protection valve is movable between an open position, in which an exchange of gas is made possible by the overpressure protection valve, and a closed position, in which an exchange of gas is prevented by the overpressure protection valve. The overpressure protection valve is situated in its closed position if the internal pressure in the operating liquid container interior is lower than the maximum pressure, and the overpressure protection valve is transferred into the open position thereof if the internal pressure in the operating liquid container interior is higher than the maximum pressure.

The correspondingly designed operating liquid container system offers the advantage that, in the event of an electrical failure, for example if a battery for actuating the ventilation valve is empty owing to long standstill periods of the motor vehicle, no overpressure that exceeds the maximum pressure can build up in the operating liquid container. This is advantageous in particular in the case of a valve module whose first and fourth ports are situated in the closed positions thereof when electrically deenergized.

The overpressure protection valve is consequently connected in parallel between the first port and the third port. The overpressure protection valve may preferably be arranged and realized within the valve module.

The overpressure protection valve is a passive overpressure protection valve. This means that a valve body of the overpressure protection valve is movable not electrically (that is to say neither electromechanically nor electromagnetically) but merely by means of a pressure difference.

In the open position of the overpressure protection valve, a valve body of the overpressure protection valve is spaced apart from a valve seat of the overpressure protection valve. In the closed position of the overpressure protection valve, the valve body of the overpressure protection valve closes the valve seat of the overpressure protection valve.

The operating liquid container system preferably has an underpressure protection valve which is arranged in a fluid line between the operating liquid container interior and the atmosphere, wherein the underpressure protection valve is movable between an open position, in which an exchange of gas is made possible by the underpressure protection valve, and a closed position, in which an exchange of gas is prevented by the underpressure protection valve. Here, the underpressure protection valve is situated in its closed position if the internal pressure in the operating liquid container interior is higher than the minimum pressure, wherein the underpressure protection valve is transferred into the open position thereof if the internal pressure in the operating liquid container interior is lower than the minimum pressure.

The correspondingly designed operating liquid container system offers the advantage that, in the event of an electrical failure, for example if a battery for actuating the ports/valves of the valve module is empty owing to long standstill periods of the motor vehicle, no underpressure that falls below the minimum internal pressure can be assumed in the operating liquid container. This is advantageous in particular in the case of a valve module whose first and fourth ports are situated in the closed positions thereof when electrically deenergized.

The underpres sure protection valve is consequently connected in parallel between the first port and the third port. The underpressure protection valve may preferably be arranged and realized within the valve module.

The underpressure protection valve is a passive underpressure protection valve. This means that a valve body of the underpressure protection valve is movable not electrically (that is to say neither electromechanically nor electromagnetically) but merely by means of a pressure difference.

In the open position of the underpressure protection valve, a valve body of the underpressure protection valve is spaced apart from a valve seat of the underpressure protection valve. In the closed position of the underpressure protection valve, the valve body of the underpressure protection valve closes the valve seat of the underpressure protection valve.

BRIEF DESCRIPTION OF THE DRAWINGS

Further advantages, details and features of the invention will emerge below from the exemplary embodiments that are discussed. Here, in the figures, in detail:

FIG. 3A is a schematic illustration of one of the first to fourth valves, which is designed as a solenoid valve and is situated in its open position;

FIG. 3B shows the solenoid valve illustrated in FIG. 3A in its closed position;

FIG. 4A is a schematic illustration of one of the first to fourth valves, which is designed as a valve with a spindle drive;

FIG. 4B shows the valve illustrated in FIG. 4A in a different position;

FIG. 5 is a schematic illustration of one of the first to fourth valves, which is designed as a shape memory valve and is situated in its open position;

FIG. 7A is a schematic illustration of a further operating liquid container system according to the invention, which has a valve module according to the invention according to a further embodiment;

FIG. 7C shows a valve module according to a further embodiment of the present invention; and FIG. 8 shows a valve module according to a yet further embodiment of the present invention.

DETAILED DESCRIPTION OF THE DRAWINGS

In the description that now follows, identical reference designations are used to denote identical components or identical features, such that a description given in relation to one figure with regard to a component also applies to the other figures, such that a repeated description will not be given. Furthermore, individual features that have been described in conjunction with one embodiment are also usable separately in other embodiments.

Figure 1A:
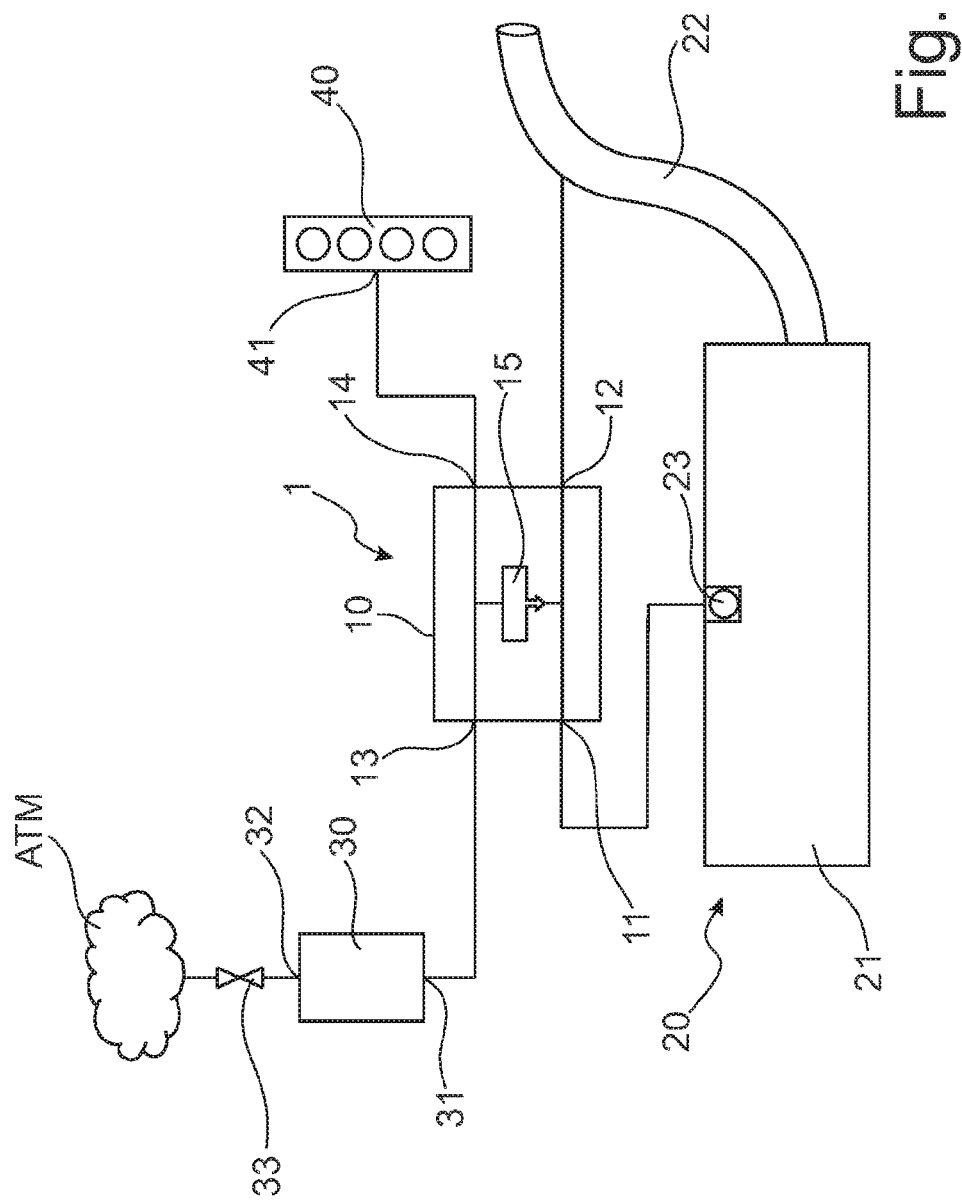
FIG. 1A is a schematic illustration of an operating liquid container system according to the invention which has a valve module according to the invention.

FIG. 1A shows an operating liquid container system 100 for a motor vehicle having an internal combustion engine 40. The operating liquid container system 100 has an operating liquid container 20, into the operating liquid container interior 21 of which a filler pipe 22 for the filling of the operating liquid container interior 21 with an operating liquid opens. In the exemplary embodiment illustrated, the operating liquid container 20 is designed as a fuel container 20.

The operating liquid container system 100 furthermore has an adsorption filter 30. In the exemplary embodiment illustrated, the adsorption filter 30 is designed as an activated carbon filter 30. The adsorption filter 30 serves for the adsorption of operating liquid that is present in the vapor phase. In the illustrated exemplary embodiment, the activated carbon filter 30 serves for the adsorption of fuel vapors that are expelled from the fuel tank 20. As can be seen from FIG. 1A, the adsorption filter 30 is fluidically connected via an outlet port 32 to the atmosphere. Between the outlet port 32 and the atmosphere, there is furthermore arranged a diagnostic valve 33, also referred to as OBD (on-board diagnostic) valve. By means of the diagnostic valve 33, it is for example possible to carry out leak-tightness tests of the activated carbon filter 30 and/or of the fuel tank 20 and/or of a valve module 1 that is yet to be discussed.

It can also be seen from FIG. 1A that the operating liquid container system 100 has a valve module 1 with a housing 10. A first port 11, a second port 12, a third port 13 and a fourth port 14 are formed in the housing 10. The first port 11 is fluidically connected via a fluid line to a ventilation valve 23 of the tank 20. In the exemplary embodiment illustrated, the ventilation valve 23 is designed as a roll-over valve 23. The present invention is however not restricted to a corresponding design of the valve 23. The second port 12 is fluidically connected via a further fluid line to the filler pipe 22. The fourth port 14 is fluidically connected via a yet further fluid line to an intake tract inlet port 41 of an intake tract (not illustrated in the figures) of the internal combustion engine 40. The third port 13 of the valve module 10 is fluidically connected via a yet further fluid line to an inlet port 31 of the adsorption filter 30.

As can be seen from FIG. 1A, the first port 11 is fluidically connected, within the housing 10, in each case to the second port 12 and the third port 13 and to the fourth port 14. The second port 12 in turn is fluidically connected, within the housing 10, in each case to the third port 13 and to the fourth port 14. The third port 13 in turn is likewise fluidically connected, within the housing 10, to the fourth port 14.

The valve module 1 furthermore has a liquid-vapor separator 15, which can also be referred to as droplets separator 15. The first port 11 and the second port 12 are fluidically connected via the droplets separator 15 to the third port 13 and to the fourth port 14. Thus, the first port 11 is connected directly in series to the second port 12. By contrast, the first port 11 is connected to the third port 13 via the liquid-vapor separator 15. Furthermore, the first port 11 is connected to the fourth port 14 likewise via the liquid-vapor separator 15. The second port 12 is connected to the third port 13 via the liquid-vapor separator 15. Furthermore, the second port 12 is connected to the fourth port 14 likewise via the liquid-vapor separator 15. The third port 13 is fluidically connected directly to the fourth port 14.

Figure 1B:
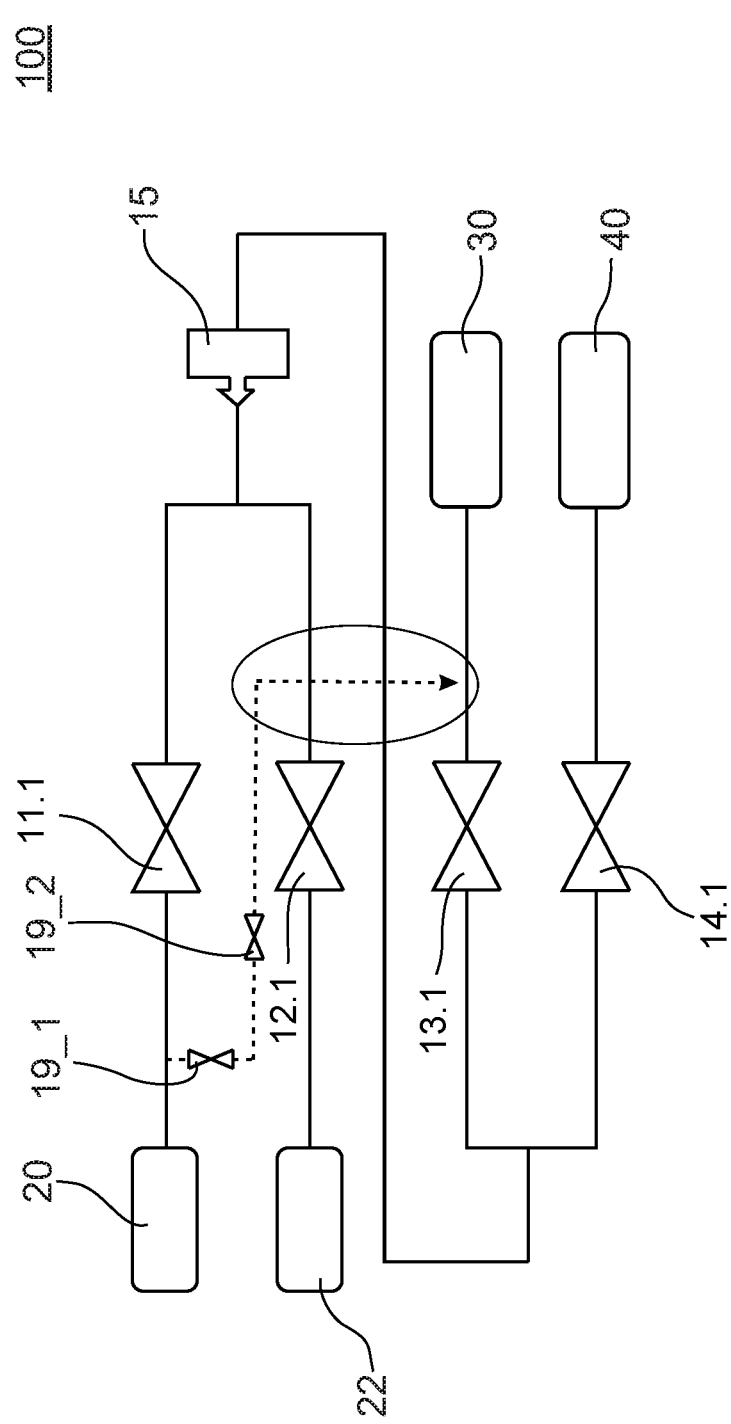
FIG. 1B shows the operating liquid container system illustrated in FIG. 1A in the form of a fluid-technical illustration.

FIG. 1B shows the operating liquid container system 100 illustrated in FIG. 1A in a fluid-technical illustration. Here, the first port 11 is designed as a first valve 11.1, the second port 12 is designed as a second valve 12.1, the third port 13 is designed as a third valve 13.1, and the fourth port 14 is designed as a fourth valve 14.1.

It can also be seen from FIG. 1B that a pressure bypass, illustrated as a dashed line, is set up between the tank 20 and upstream of the first valve 11.1 and the activated carbon filter 30 upstream of the inlet port 31 of the activated carbon filter 30. Said pressure bypass has an overpressure protection valve 19_1, which is arranged in the fluid line between the fuel container interior 21 and the atmosphere, more specifically the inlet port 31 of the activated carbon filter 30. The overpressure protection valve 19_1 is movable between an open position, in which an exchange of gas is made possible by the overpressure protection valve 19_1, and a closed position, in which an exchange of gas is prevented by the overpressure protection valve 19_1. Here, the overpressure protection valve 19_1 is situated in its closed position if the internal pressure in the operating liquid container interior 21 is lower than the maximum pressure, whereas the overpressure protection valve 19_1 is transferred into its open position if the internal pressure in the operating liquid container interior 21 becomes higher than the maximum pressure.

The pressure bypass may furthermore have an underpressure protection valve 19_2, which may likewise be arranged in the fluid line between the operating liquid container interior 21 and the inlet port 31 of the activated carbon filter 30. The underpressure protection valve 19_2 is movable between an open position, in which an exchange of gas is made possible by the underpressure protection valve 19_2, and a closed position, in which an exchange of gas is prevented by the underpressure protection valve 19_2. The underpressure protection valve 19_2 is situated in its closed position if the internal pressure in the operating liquid container interior is higher than the minimum pressure, whereas the underpressure protection valve 19_2 is transferred into its open position if the internal pressure in the operating liquid container interior 21 is lower than the minimum pressure.

Both the overpressure protection valve 19_1 and the underpressure protection valve 19_2 may be arranged within the housing 10 of the valve module.

The valve module 1 is designed such that the first port 11 or the first valve 11.1, the second port 12 or the second valve 12.1, the third port 13 or the third valve 13.1 and the fourth port 14 or the fourth valve 14.1 are actuatable in each case independently of one another between an open position, in which fluid communication through the respective port 11, 12, 13, 14 or the respective valve 11.1, 12.1, 13.1, 14.1 is made possible, and a closed position, in which fluid communication through the respective port 11, 12, 13, 14 or the respective valve 11.1, 12.1, 13.1, 14.1 is prevented. The valve module 1 is in this case designed such that the first port 11 or the first valve 11.1 and the second port 12 or the second valve 12.1 and the third port 13 or the third valve 13.1 and the fourth port 14 or the fourth valve 14.1 are each electrically actuatable between the open position thereof and the closed position thereof.

Figure 2A:
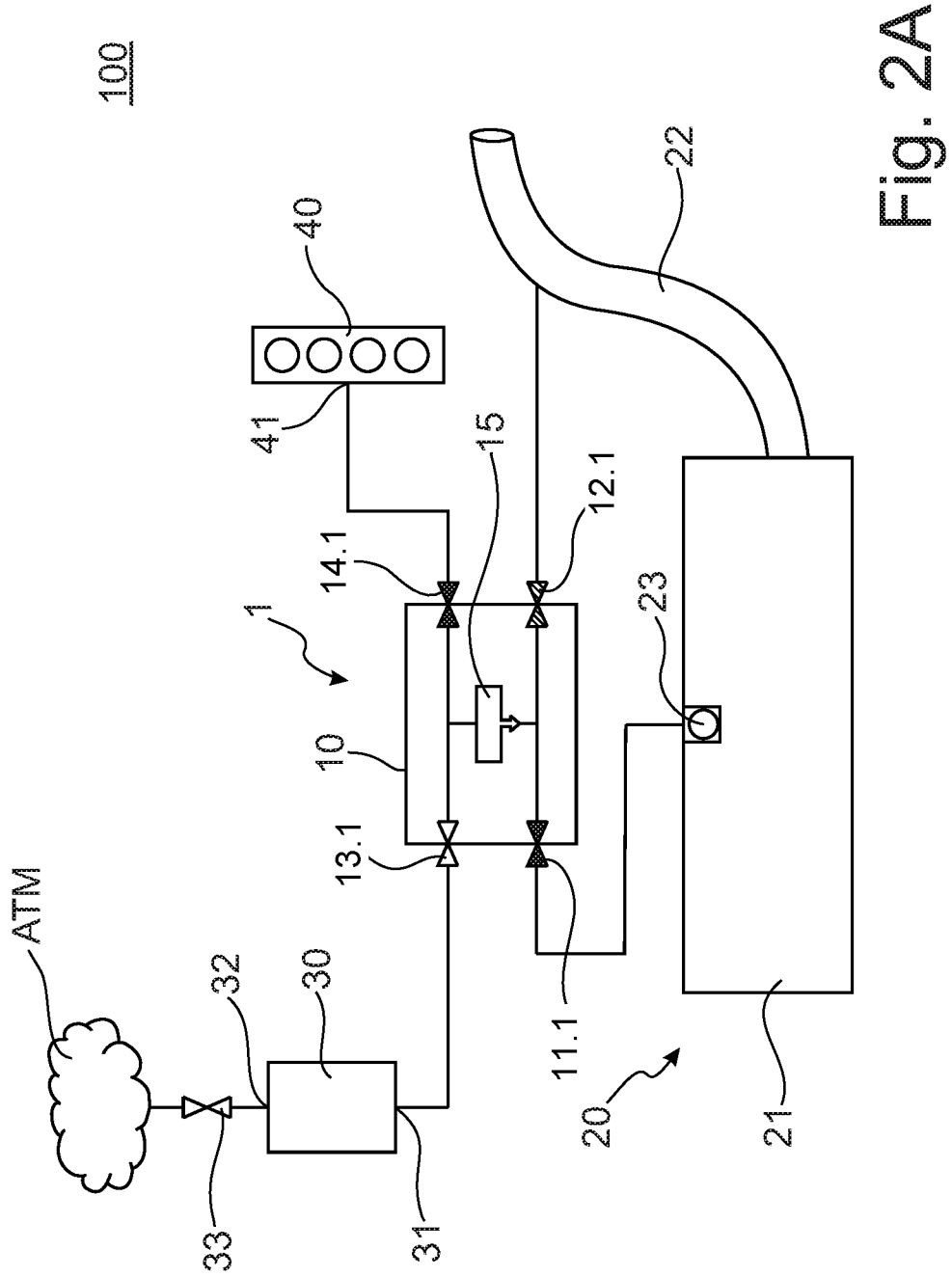
FIG. 2A shows the operating liquid container system illustrated in FIG. 1A, wherein the first to fourth ports of the valve module are designed as first to fourth valves, wherein the first to fourth valves are situated in an exemplary first switching position.

In FIG. 2A, the valve module 1 has a switching position in which the first valve 11.1 and the fourth valve 14.1 are each closed. The position of the second valve 12.1 is not restricted, such that the second valve 12.1 may be situated either in its open position, in its closed position or in an intermediate position between the open position and the closed position. The third valve 13.1 is situated in its open position. With corresponding switching of the first to fourth valves 11.1, 12.1, 13.1, 14.1, the operating liquid container system 100 is situated in a state in which purging of the activated carbon filter 30 is prevented. During this operation, the motor vehicle can be driven by means of the internal combustion engine 40. If the motor vehicle is a hybrid motor vehicle which has an internal combustion engine 40 and additionally an alternative drive source, for example an electric motor, the motor vehicle may also be operated in an electric drive mode, wherein the switching positions of the valve module 1 are then as in FIG. 2A. The switching position of the valve module 1 as illustrated in FIG. 2A is also used during the parking of the motor vehicle.

Figure 2B:
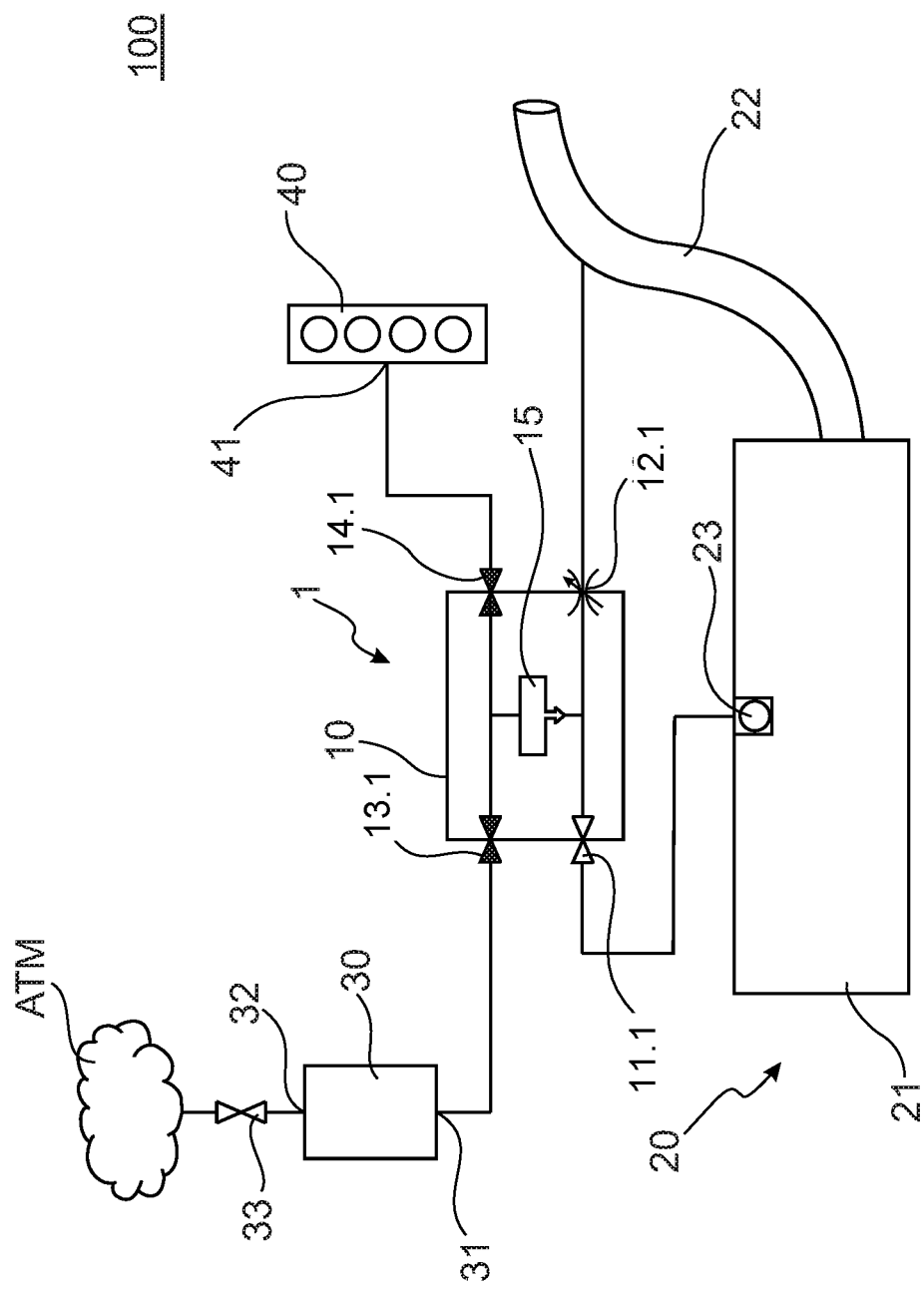
FIG. 2B shows the operating liquid container system illustrated in FIG. 2A, wherein the first to fourth valves are situated in an exemplary second switching position.

FIG. 2B shows the operating liquid container system 100 illustrated in FIG. 1, wherein the valve module 1 is situated in a different switching state than in FIG. 2A. In the case of the valve module 1 illustrated in FIG. 2B, said valve module 1 is situated in a position in which filling and a stoppage of filling are realized, in the case of which a fuel-vapor mixture expelled from the fuel tank 20 is conducted back into the filler pipe 22 and, by the latter, is either released to the atmosphere, wherein said mixture is extracted by an extraction device (not illustrated in the figures), and/or is also partially conveyed back into the fuel tank interior 21. For this purpose, the first valve 11.1 is situated in its open position. Both the third valve 13.1 and the fourth valve 14.1 is situated in the respective closed position thereof. The second valve 12.1 is, in the present example, designed as an adjustable valve, the throughflow volume flow of which is adjustable.

The valve module 1 illustrated in FIG. 2B could however also be designed such that the first valve 11.1 is designed as an adjustable valve, and the second valve 12.1 is situated in its open position.

Figure 2C:
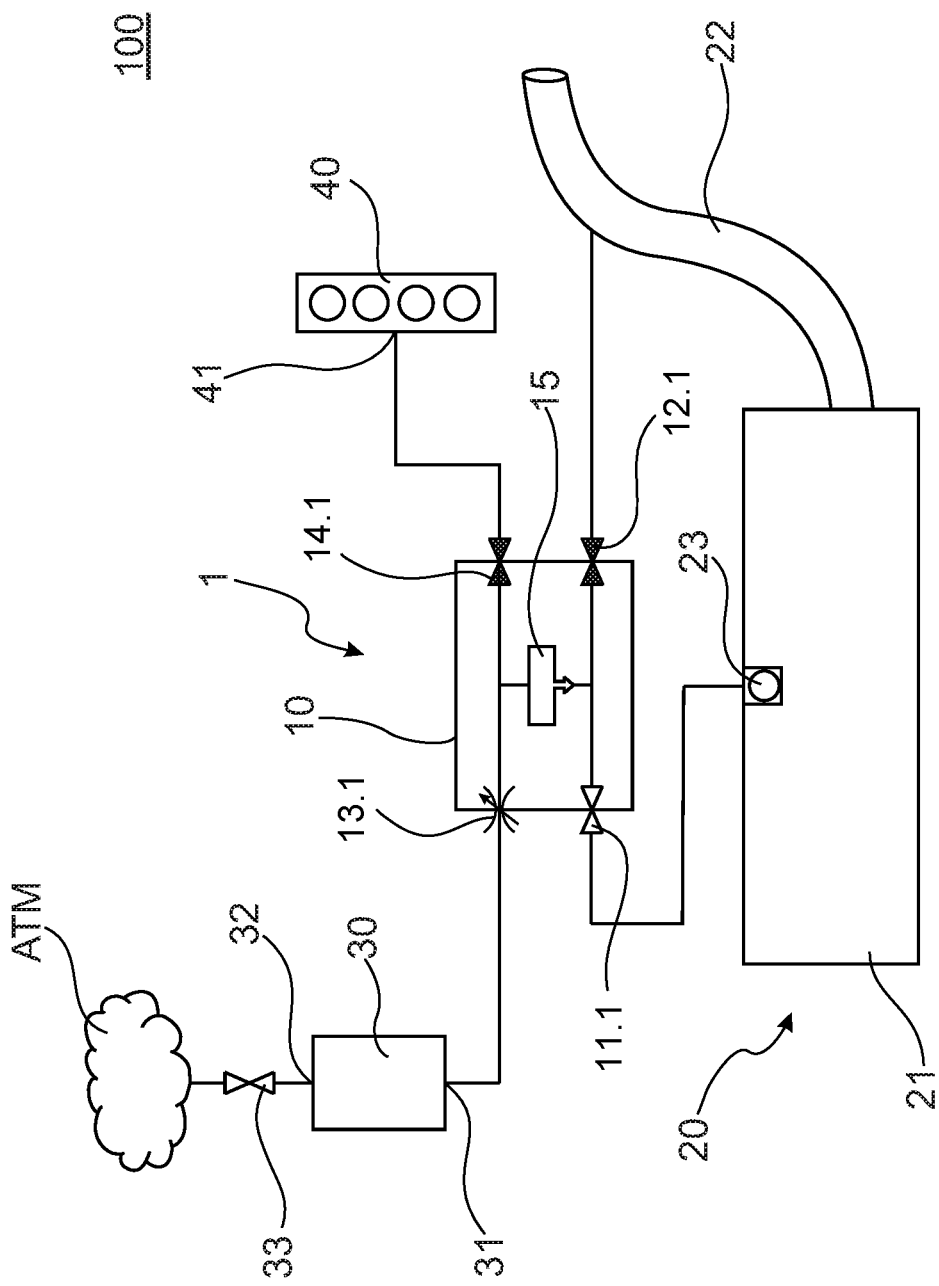
FIG. 2C shows the operating liquid container system illustrated in FIG. 2A, wherein the first to fourth valves are situated in an exemplary third switching position.

In the case of the operating liquid container system 100 illustrated in FIG. 2C, the valve module 1 is situated in a switching position in the case of which filling and a stoppage of filling are made possible, wherein the gases expelled from the fuel tank 20 are released by the activated carbon filter 30 to the atmosphere. For this purpose, the first valve 11.1 is situated in its open position, the second valve 12.1 is situated in its closed position, the fourth valve 14.1 is situated likewise in its closed position, and the third valve 13.1 is designed as an adjustable valve, the throughflow volume flow of which is adjustable. If the throughflow volume flow through the third valve 13.1 is reduced, only a relatively small volume flow of fuel vapor can be discharged from the fuel container 20 to the activated carbon filter 30, such that a pressure within the fuel tank 20 rises, such that a fuel column within the filler pipe 22 likewise rises until a cut-off opening of a refueling nozzle (not illustrated) is reached, and a stoppage of filling is realized.

It is however also possible, in the case of the operating liquid container system 100 illustrated in FIG. 2C, for the second valve 12.1 to be designed as an adjustable valve, such that a recirculation of vapors expelled from the operating liquid container 20 back into the operating liquid container interior 21 via the filler pipe 22 is made possible in controlled fashion.

Figure 2D:
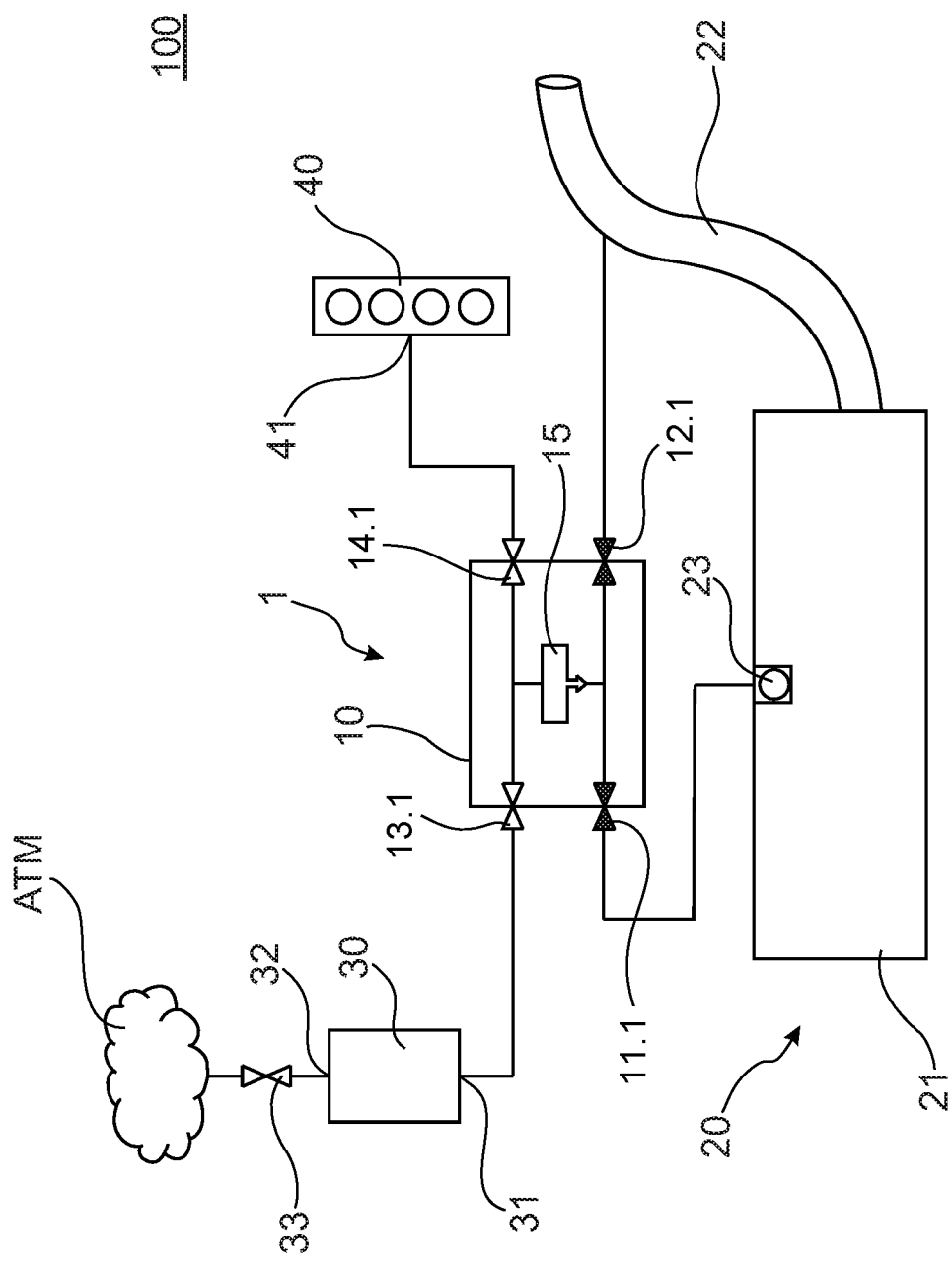
FIG. 2D shows the operating liquid container system illustrated in FIG. 2A, wherein the first to fourth valves are situated in an exemplary fourth switching position.

In the case of the operating liquid container system 100 illustrated in FIG. 2D, the valve module 1 is situated in a switching position which is suitable for the operation of the motor vehicle in a so-called combustion mode, in which the drive of the motor vehicle is provided by means of the internal combustion engine 40. Here, the activated carbon filter 30 is purged by means of intake air of the internal combustion engine 30. The switching position of the valve module 1 illustrated in FIG. 2D is also suitable for an accident situation of the motor vehicle. For this purpose, both the first valve 11.1 and the second valve 12.1 are each situated in the closed position thereof, whereas the third valve 13.1 and the fourth valve 14.1 are each situated in the open position thereof.

Figure 2E:
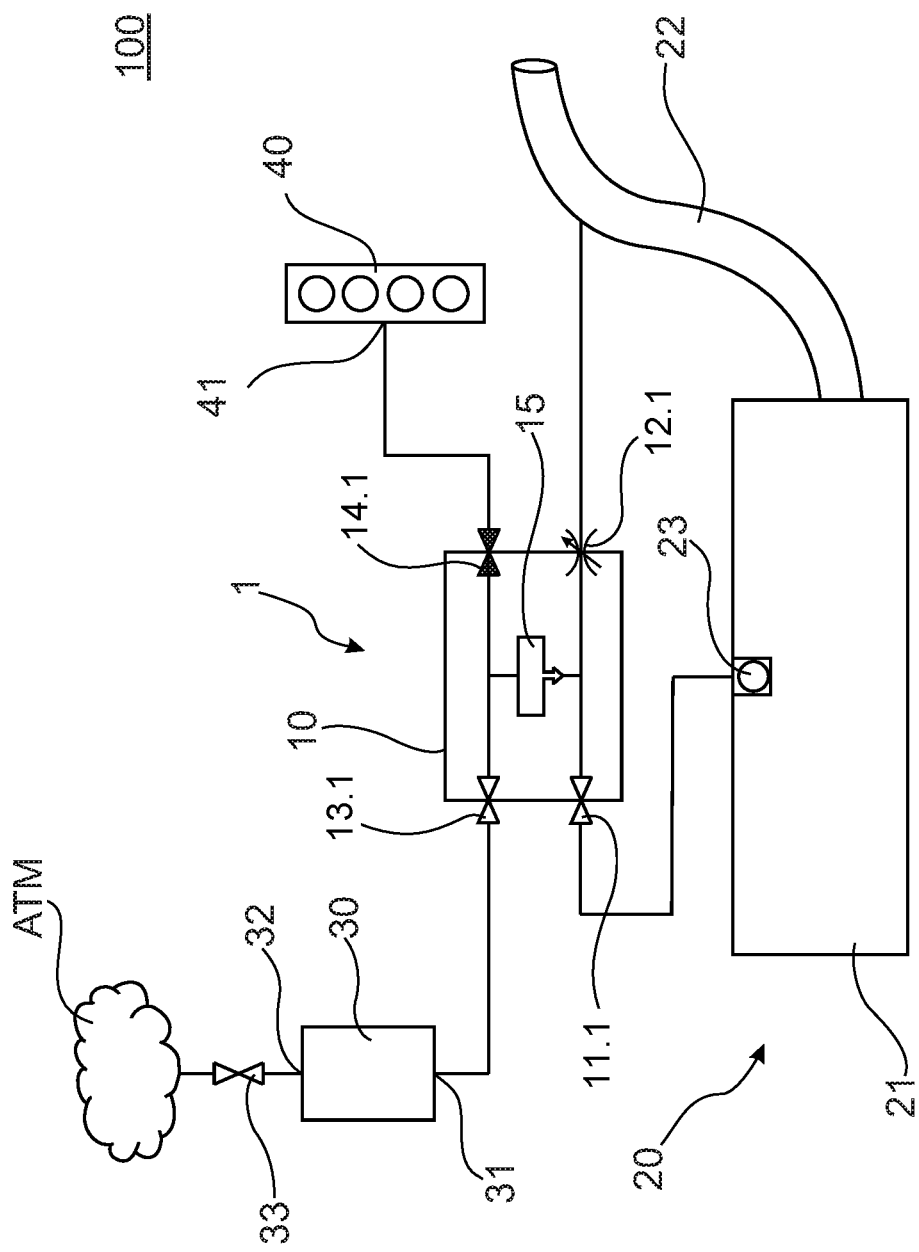
FIG. 2E shows the operating liquid container system illustrated in FIG. 2A, wherein the first to fourth valves are situated in an exemplary fifth switching position.

In the case of the operating liquid container system 100 illustrated in FIG. 2E, the valve module 1 is situated in a switching position in the case of which a filling process is made possible in which fuel vapors from the fuel tank 20 are conducted for filtering purposes to the activated carbon filter 30 and at the same time are partially also conveyed via the filler pipe 22 back to the fuel container interior 21. The switching position of the valve module 1 illustrated in FIG. 2E is also suitable for performing diagnosis of the system by means of the OBD valve 33. Furthermore, the switching position of the valve module 1 as illustrated in FIG. 2E is suitable for an active dissipation of pressure within the fuel tank 20. For this purpose, the first valve 11.1 and the third valve 13.1 are each situated in the open position thereof. The second valve 12.1 is designed as an adjustable valve, and the fourth valve 14.1 is situated in its closed position.

There are no limitations with regard to the design of the first to fourth valves 11.1, 12.1, 13.1, 14.1. In FIGS. 3A and 3B, a corresponding valve 11.1, 12.1, 13.1, 14.1 is designed as a solenoid valve, which has a coil 50 and a core 51 arranged in said coil, which core in turn is connected to a valve body that can close a valve seat. In FIG. 3A, the solenoid valve is illustrated in its open position, whereas, in FIG. 3B, the solenoid valve is illustrated in its closed position.

FIGS. 4A and 4B illustrate a valve 11.1, 12.1, 13.1, 14.1 in the case of which a valve body 53 is arranged on a spindle 52. By means of a rotational movement of the spindle 52, the position of the valve body 53 is varied such that the different ports of the valve module 1 can either be opened or can be closed by means of the valve body 53.

FIG. 5 shows a yet further embodiment of a valve 11.1, 12.1, 13.1, 14.1, which is designed as a shape memory valve. The shape memory valve has in this case a shape memory component 54 which is connected to a valve body, such that, after corresponding electrical energization or heating of the shape memory component 54, the valve body either closes a valve opening or is spaced apart from said valve opening.

Figure 6A:
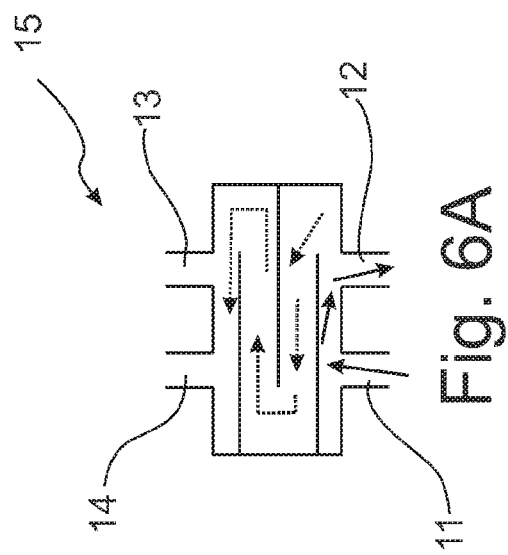
FIG. 6A is a schematic illustration of a liquid-vapor separator which is realized in the valve module according to the invention and which is based on a labyrinthine fluid path.
Figure 6B:
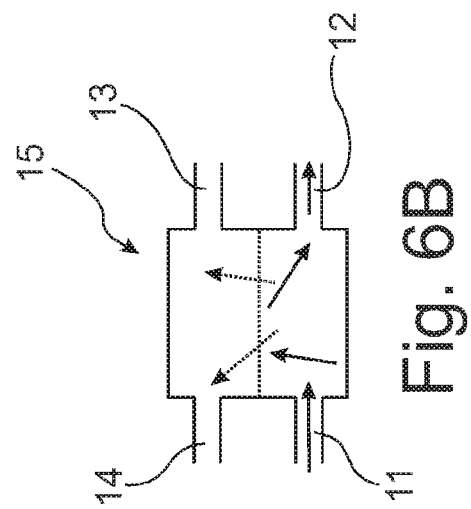
FIG. 6B is a schematic illustration of a liquid-vapor separator which is realized in the valve module according to the invention and which is based on a diaphragm arranged therein.
Figure 6C:
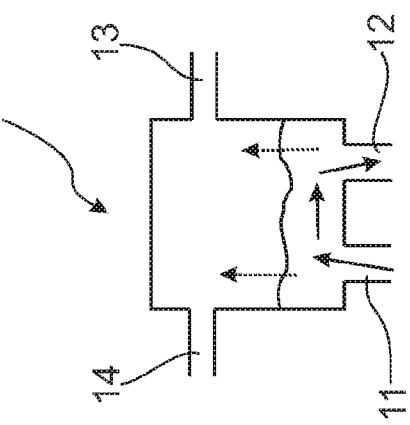
FIG. 6C is a schematic illustration of a liquid-vapor separator which is realized in the valve module according to the invention and which has a bubbling-out facility.

FIGS. 6A to 6C illustrate various embodiments of a liquid-vapor separator 15. In the case of the liquid-vapor separator 15 illustrated in FIG. 6A, said liquid-vapor separator has a labyrinthine fluid path, such that no liquid can pass via the first port 11 to the third port 13 and to the fourth port 14. By contrast, an exchange of gas between all of the ports 11-14 remains possible.

In the case of the liquid-vapor separator 15 illustrated in FIG. 6B, said liquid-vapor separator has a diaphragm 16 which separates the first port 11 from the third port 13 and the fourth port 14. The diaphragm has the effect that operating liquid cannot pass via the first port 11 to the third port 13 and to the fourth port 14. By contrast, liquid can still pass from the first port 11 to the second port 12. Furthermore, an exchange of gas between all of the ports 11-14 is made possible by the diaphragm 16.

FIG. 6C illustrates a liquid-vapor separator 15 in the case of which a liquid column forms within a housing of the liquid-vapor separator, wherein the first port 11 and the second port 12 open into said liquid column. The third port 13 and the fourth port 14 are situated above the liquid column, such that a bubbling-out facility for gases or vapors that are introduced into the liquid column via the first port 11 is made possible via the third port 11 and the fourth port 14.

FIGS. 6A, 6B and 6C show the respective liquid-vapor separators 15 in each case fluidically connected to the four ports 11, 12, 13, 14 of the valve module 1. This fluidic connection may self-evidently also be configured as illustrated in FIGS. 1A to 2E, such that the first port 11 and the second port 12 are fluidically connected via one common fluidic connection, and the third port 13 and the fourth port 14 are fluidically connected via another common fluidic connection, in each case to the liquid-vapor separator 15.

FIG. 7A shows an operating liquid container system 100 for a motor vehicle having an internal combustion engine 40 according to a further embodiment of the present invention. The operating liquid container system 100 illustrated in FIG. 7A differs from the operating liquid container systems 100 illustrated in FIGS. 1A to 2E in that the valve module 10 does not have a fourth port for connection to the intake tract of an internal combustion engine 40.

Figure 7B:
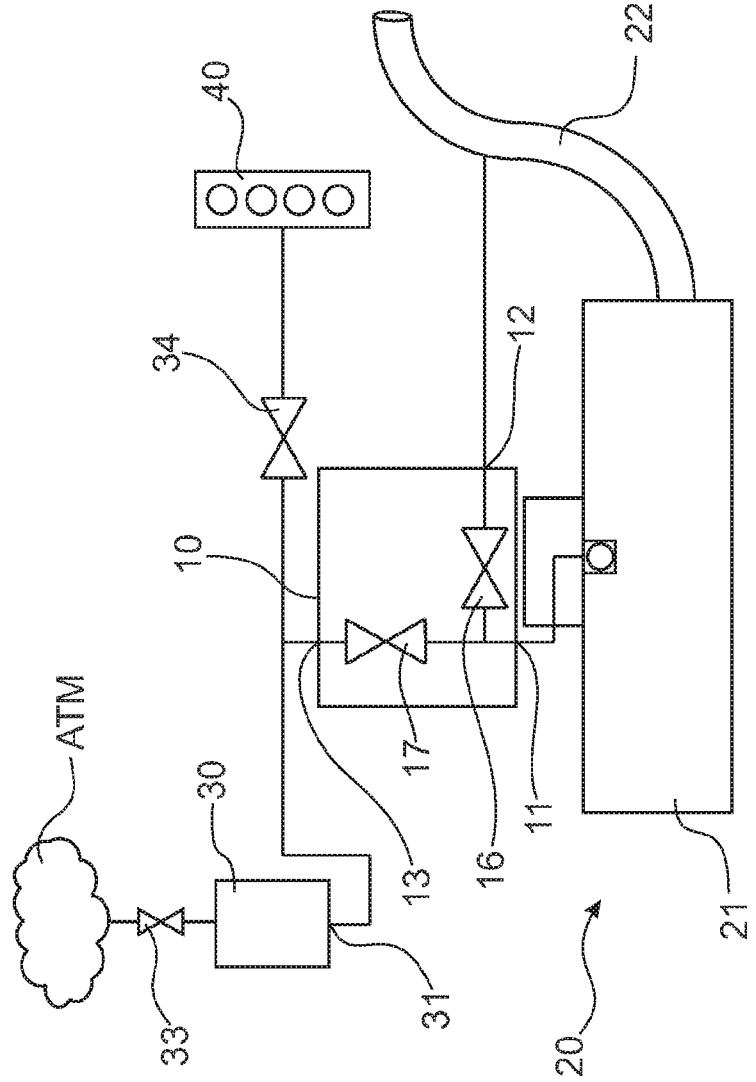
FIG. 7B is a schematic illustration of a yet further operating liquid container system according to the invention, which has a valve module according to the invention according to a yet further embodiment.

FIG. 7B shows a possible construction of the valve module 10. Between the first port 11 and the second port 12, there is arranged a first valve apparatus 16, which is fluidically connected to the first port 11 and to the second port 12. The first valve apparatus 16 is actuatable between an open position, in which a fluid flow between the first port 11 and the second port 12 is made possible by the first valve apparatus 16, and a closed position, in which a fluid flow between the first port 11 and the second port 12 is prevented by the first valve apparatus 17. Furthermore, between the first port 11 and the third port 13, there is arranged a second valve apparatus 17, which is fluidically connected to the first port 11 and to the third port 13. Here, the second valve apparatus 17 is actuatable between an open position, in which a fluid flow between the first port 11 and the third port 13 is made possible by the second valve device 17, and a closed position, in which a fluid flow between the first port 11 and the third port 13 is prevented by the second valve apparatus 17.

FIG. 7C illustrates a valve module 1 according to a further embodiment of the present invention on its own. The valve module 1 illustrated in FIG. 7C may be used for example in the operating liquid container systems 100 shown in FIGS. 7A and 7B.

The valve module 1 is designed such that the first valve apparatus 16 has at least two first valve devices 16_1, 16_2, 16_3, 16_4, which are fluidically connected to one another in parallel. In the exemplary embodiment illustrated, the first valve apparatus 16 has four first valve devices 16_1, 16_2, 16_3, 16_4. Here, each first valve device 16_1, 16_2, 16_3, 16_4 is actuatable between an open position and a closed position.

The second valve apparatus 17 of the valve module 1 illustrated in FIG. 7C has at least two second valve devices 17_1, 17_2, 17_3, 17_4, 17_5, which are fluidically connected to one another in parallel. In the exemplary embodiment illustrated, the second valve apparatus 17 has five second valve devices 17_1, 17_2, 17_3, 17_4, 17_5. Here, each second valve device 17_1, 17_2, 17_3, 17_4, 17_5 is actuatable between an open position and a closed position.

The first valve devices 16_1, 16_2, 16_3, 16_4 and the second valve devices 17_1, 17_2, 17_3, 17_4, 17_5 may be designed as illustrated in FIGS. 3A to 5, such that reference is made to the corresponding description above.

FIG. 8 illustrates a valve module 1 according to a further embodiment of the present invention on its own. The valve module 1 illustrated in FIG. 8 may be used for example in the operating liquid container systems 100 shown in FIG. 1A.

The valve module 1 is designed such that a first valve apparatus 16 has at least two first valve devices 16_1, 16_2, 16_3, 16_4, which are fluidically connected to one another in parallel. In the exemplary embodiment illustrated, the first valve apparatus 16 has four first valve devices 16_1, 16_2, 16_3, 16_4. Here, each first valve device 16_1, 16_2, 16_3, 16_4 is actuatable between an open position and a closed position.

A second valve apparatus 17 of the valve module 1 illustrated in FIG. 8 has at least two second valve devices 17_1, 17_2, 17_3, 17_4, 17_5, which are fluidically connected to one another in parallel. In the exemplary embodiment illustrated, the second valve apparatus 17 has five second valve devices 17_1, 17_2, 17_3, 17_4, 17_5. Here, each second valve device 17_1, 17_2, 17_3, 17_4, 17_5 is actuatable between an open position and a closed position.

A third valve apparatus 18 of the valve module 1 illustrated in FIG. 8 has at least two third valve devices 18_1, 18_2, 18_3, 18_4, 18_5, which are fluidically connected to one another in parallel. In the exemplary embodiment illustrated, the third valve apparatus 18 has four third valve devices 18_1, 18_2, 18_3, 18_4. Here, each third valve device 18_1, 18_2, 18_3, 18_4 is actuatable between an open position and a closed position.

The first valve devices 16_1, 16_2, 16_3, 16_4, the second valve devices 17_1, 17_2, 17_3, 17_4, 17_5 and the third valve devices device 18_1, 18_2, 18_3, 18_4 may be designed as illustrated in FIGS. 3A to 5, such that reference is made to the corresponding description above.

LIST OF REFERENCE DESIGNATIONS

1 Valve module
10 Housing (of the valve module)
11 First port/inlet port (of the valve module)
11.1 First valve/inlet valve
12 Second port (of the valve module)
12.1 Second valve
13 Third port (of the valve module)
13.1 Third valve
14 Fourth port (of the valve module)
14.1 Fourth valve
15 Liquid-vapor separator/droplet separator (of the valve module)
16 First valve apparatus
16_1 First valve device
16_2 First valve device
16_3 First valve device
16_4 First valve device
17 Second valve apparatus
17_1 Second valve device
17_2 Second valve device
17_3 Second valve device
17_4 Second valve device
17_5 Second valve device
18 Third valve apparatus
18_1 Third valve device
18_2 Third valve device
18_3 Third valve device
18_4 Third valve device
19_1 Overpressure protection valve
19_2 Underpressure protection valve
20 Operating liquid container/fuel container
21 Operating liquid container interior
22 Filler pipe
23 Ventilation valve/roll-over valve (of the operating liquid container)
24 Ventilation line
30 Adsorption filter/activated carbon filter
31 Inlet port (of the adsorption filter)
32 Outlet port (of the adsorption filter)
33 Diagnostic valve/OBD valve
34 Shut-off valve
40 Internal combustion engine/engine
41 Intake-tract inlet port (of the internal combustion engine)
50 Coil (of a solenoid valve)
51 Core (of a solenoid valve)
52 Spindle (of a valve with spindle drive)
53 Valve body (of a valve with spindle drive)
54 Shape memory component (of a shape memory valve)
100 Operating liquid container system
ATM Atmosphere

What is claimed is:

1. A valve module for an operating liquid container system, the valve module comprising:
a housing;
the housing having a first port configured to be fluidically connected to an operating liquid container interior;
the housing having a second port configured to be fluidically connected to a filler pipe;
the housing having a third port configured to be fluidically connected to atmosphere;
the first port is fluidically connected, within the housing, in each case to the second port and to the third port;
the second port is fluidically connected, within the housing, to the third port; and
a first valve apparatus arranged between the first port and the second port and fluidically connected to the first port and to the second port;
the first valve apparatus actuatable between an open position, in which a fluid flow between the first port and the second port is made possible by the first valve apparatus, and a closed position, in which the fluid flow between the first port and the second port is prevented by the first valve apparatus;

a second valve apparatus arranged between the first port and the third port and fluidically connected to the first port and to the third port; and the second valve apparatus actuatable between an open position, in which a fluid flow between the first port and the third port is made possible by the second valve apparatus, and a closed position, in which the fluid flow between the first port and the third port is prevented by the second valve apparatus;

the first valve apparatus has at least two first valve devices which are fluidically connected to one another in parallel, whereby each of the at least two first valve devices is arranged to receive a respective portion of fluid flow from a shared fluid line; and each first valve device is actuatable between an open position and a closed position.

2. The valve module as claimed in claim 1, wherein the at least two first valve devices have mutually different free opening cross-sectional areas.

3. The valve module as claimed in claim 1, wherein:
the second valve apparatus has at least two second valve devices which are fluidically connected to one another in parallel; and
each second valve device is actuatable between an open position and a closed position.

4. The valve module as claimed in claim 3, wherein the at least two second valve devices have mutually different free opening cross-sectional areas.

5. The valve module as claimed in claim 1, wherein the first valve apparatus and/or the second valve apparatus are/is electrically actuatable between the open position and the closed position.

6. The valve module as claimed in claim 1, further comprising:
the housing having a fourth port configured to be fluidically connected to an intake tract of an internal combustion engine;
a third valve apparatus arranged between the third port and the fourth port and fluidically connected to the third port and to the fourth port; and
the third valve apparatus actuatable between an open position, in which a fluid flow between the third port and the fourth port is made possible by the third valve apparatus, and a closed position, in which the fluid flow between the third port and the fourth port is prevented by the third valve apparatus.

7. The valve module as claimed in claim 6, wherein:
the third valve apparatus has at least two third valve devices which are fluidically connected to one another in parallel; and
each third valve device is actuatable between an open position and a closed position.

8. The valve module as claimed in claim 7, wherein the at least two third valve devices have mutually different free opening cross-sectional areas.

9. The valve module as claimed in claim 1, further comprising the following features:
a ratio of a first cross-sectional area of the first port to a second cross-sectional area of the second port amounts to between 0.64 and 41; and/or
a ratio of a first cross-sectional area of the first port to a third cross-sectional area of the third port amounts to between 0.5 and 4.

10. A valve module for an operating liquid container system, the valve module comprising:
a housing;
the housing having a first port configured to be fluidically connected to an operating liquid container interior;
the housing having a second port configured to be fluidically connected to a filler pipe;
the housing having a third port configured to be fluidically connected to atmosphere;
the first port is fluidically connected, within the housing, in each case to the second port and to the third port;
the second port is fluidically connected, within the housing, to the third port;
the first port and the second port and the third port are each independently of one another adjustable in each case between an open position, in which fluid communication through the respective port is made possible, and a closed position, in which fluid communication through the respective port is prevented;
the housing has a fourth port configured to be fluidically connected to an intake tract of an internal combustion engine;
the first port is fluidically connected, within the housing, to the fourth port;
the second port is fluidically connected, within the housing, to the fourth port;
the third port is fluidically connected, within the housing, to the fourth port; and
the fourth port is adjustable between an open position, in which fluid communication through the fourth port is made possible, and a closed position, in which fluid communication through the fourth port is prevented.

11. The valve module as claimed in claim 10, wherein the first port and/or the second port and/or the third port and/or the fourth port are/is each actuatable electrically between the open position and the closed position.

12. The valve module as claimed in claim 10, wherein the first port is designed as a first valve and/or the second port is designed as a second valve and/or the third port is designed as a third valve and/or the fourth port is designed as a fourth valve.

13. The valve module as claimed in claim 12, wherein the first valve and/or the second valve and/or the third valve and/or the fourth valve are each designed as a proportional valve and are/is electrically adjustable in continuous fashion between an open position and a closed position.

14. The valve module as claimed in claim 10, wherein the first port and/or the second port and/or the third port and/or the fourth port are/is adjustable in discrete fashion between the respective open position thereof and the respective closed position thereof.

15. The valve module as claimed in claim 10, wherein the valve module has a liquid-vapor separator, via which the first port and the second port are fluidically connected to the third port and/or the fourth port.

16. An operating liquid container system for a motor vehicle, comprising:
an operating liquid container having an operating liquid container interior;
a filler pipe to fill the operating liquid container interior with an operating liquid;
a valve module;
the valve module comprising a housing;
the housing having a first port fluidically connected to the operating liquid container interior;
the housing having a second port fluidically connected to the filler pipe; and the housing having a third port fluidically connected to atmosphere;

the first port is fluidically connected, within the housing, in each case to the second port and to the third port;

the second port is fluidically connected, within the housing, to the third port;

the first port is fluidically connected to the operating liquid container interior, the second port is fluidically connected to the filler pipe, and the third port is fluidically connected to the atmosphere;

a first valve apparatus arranged between the first port and the second port and fluidically connected to the first port and to the second port;

the first valve apparatus actuatable between an open position, in which a fluid flow between the first port and the second port is made possible by the first valve apparatus, and a closed position, in which the fluid flow between the first port and the second port is prevented by the first valve apparatus;

a second valve apparatus arranged between the first port and the third port and fluidically connected to the first port and to the third port; and the second valve apparatus actuatable between an open position, in which a fluid flow between the first port and the third port is made possible by the second valve apparatus, and a closed position, in which the fluid flow between the first port and the third port is prevented by the second valve apparatus;

the first valve apparatus has at least two first valve devices which are fluidically connected to one another in parallel, whereby each of the at least two first valve devices is arranged to receive a respective portion of fluid flow from a shared fluid line; and each first valve device is actuatable between an open position and a closed position.

17. The operating liquid container system as claimed in claim 16, disposed with an internal combustion engine and wherein:

the housing has a fourth port configured to be fluidically connected to an intake tract of the internal combustion engine;

the first port is fluidically connected, within the housing, to the fourth port;

the second port is fluidically connected, within the housing, to the fourth port;

the third port is fluidically connected, within the housing, to the fourth port; and the fourth port is fluidically connected to the intake tract of the internal combustion engine.

18. The operating liquid container system as claimed in claim 16, further comprising:

an adsorption filter for the adsorption of the operating liquid that is present in the vapor phase; and the third port of the valve module is fluidically connected to the adsorption filter prior to the atmosphere.

19. The operating liquid container system as claimed in claim 16, further comprising:

the first valve apparatus and the second valve apparatus are electrically actuatable between the open position and the closed position;

an electronic control device coupled to the valve module via a data line for the exchange of data; and the first valve apparatus and the second valve apparatus are actuatable between the respective open positions thereof and the respective closed positions thereof by control signals output by the electronic control device.

20. The operating liquid container system as claimed in claim 19, wherein:

the first valve apparatus and the second valve apparatus are actuatable into an intermediate position between the respective open positions thereof and the respective closed positions thereof by control signals output by the electronic control device.

21. The operating liquid container system as claimed in claim 19, further comprising:

at least one fill level sensor for determining a fill level of the operating liquid in the operating liquid container; and the electronic control device is coupled to the at least one fill level sensor via a further data line for the receipt of data.

22. The operating liquid container system as claimed in claim 16, further comprising:

an overpressure protection valve arranged in a fluid line between the operating liquid container interior and the atmosphere;

the overpressure protection valve is movable between an open position, in which an exchange of gas is made possible by the overpressure protection valve, and a closed position, in which an exchange of gas is prevented by the overpressure protection valve;

the overpressure protection valve is situated in its closed position if the internal pressure in the operating liquid container interior is lower than a maximum pressure; and the overpressure protection valve is transferred into the open position thereof if the internal pressure in the operating liquid container interior is higher than the maximum pressure.

23. The operating liquid container system as claimed in claim 16, further comprising:

an underpressure protection valve arranged in a fluid line between the operating liquid container interior and the atmosphere;

the underpressure protection valve is movable between an open position, in which an exchange of gas is made possible by the underpressure protection valve, and a closed position, in which an exchange of gas is prevented by the underpressure protection valve;

the underpressure protection valve is situated in its closed position if the internal pressure in the operating liquid container interior is higher than a minimum pressure; and the underpressure protection valve is transferred into the open position thereof if the internal pressure in the operating liquid container interior is lower than the minimum pressure.

* * * * *